United States Patent
Lee et al.

(10) Patent No.: US 10,218,982 B2
(45) Date of Patent: Feb. 26, 2019

(54) VIDEO CODING AND DECODING METHODS AND VIDEO CODING AND DECODING DEVICES USING ADAPTIVE LOOP FILTERING

(71) Applicant: SAMSUNG ELECTRONICS CO., LTD., Suwon-si (KR)

(72) Inventors: Tammy Lee, Seoul (KR); Woo-Jin Han, Suwon-si (KR); Il-Koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/874,347

(22) Filed: Jan. 18, 2018

(65) Prior Publication Data

US 2018/0160121 A1    Jun. 7, 2018

Related U.S. Application Data

(63) Continuation of application No. 15/491,112, filed on Apr. 19, 2017, now Pat. No. 9,912,954, which is a
(Continued)

(30) Foreign Application Priority Data

Aug. 14, 2009    (KR) .................... 10-2009-0075336

(51) Int. Cl.
*H04N 19/146*    (2014.01)
*H04N 19/109*    (2014.01)
(Continued)

(52) U.S. Cl.
CPC ......... *H04N 19/146* (2014.11); *H04N 19/105* (2014.11); *H04N 19/109* (2014.11);
(Continued)

(58) Field of Classification Search
CPC .................................................. H04N 19/146
See application file for complete search history.

(56) References Cited

U.S. PATENT DOCUMENTS 7,379,501 B2    5/2008  Lainema
2005/0201633 A1    9/2005  Moon et al.
(Continued)

FOREIGN PATENT DOCUMENTS

CN    1820512 A    8/2006
CN    101223552 A    7/2008
(Continued)

OTHER PUBLICATIONS

Akbulut O et al: "One-dimensional processing for efficient optimal post-process/in-loop filtering in video coding", IEEE Transactions on Consuer Electronics, IEEE Service Center, New York, NY, US, vol. 54, No. 3, Aug. 1, 2008 (Aug. 1, 2008), pp. 1346-1354, XP011235586, ISSN: 0098-3063, DOI: 10.1109/TCE.2008.4637626.
(Continued)

*Primary Examiner* — James M Pontius
(74) *Attorney, Agent, or Firm* — Sughrue Mion, PLLC

(57) ABSTRACT

A method of decoding video, the method including receiving and parsing a bitstream which includes encoded video; extracting encoded image data relating to a current picture, which image data is assigned to at least one maximum coding unit, information relating to a coded depth and an encoding mode for each of the at least one maximum coding unit, and filter coefficient information for performing loop filtering on the current picture, from the bitstream; decoding the encoded image data in units of the at least one maximum coding unit, based on the information relating to the coded depth and the encoding mode for each of the at least one maximum coding unit; and performing deblocking on the decoded image data relating to the current picture, and
(Continued)

performing loop filtering on the deblocked data, based on continuous one-dimensional (1D) filtering.

11 Claims, 18 Drawing Sheets

Related U.S. Application Data continuation of application No. 15/293,945, filed on Oct. 14, 2016, now Pat. No. 9,668,000, which is a continuation of application No. 15/133,844, filed on Apr. 20, 2016, now Pat. No. 9,491,474, which is a continuation of application No. 13/390,350, filed as application No. PCT/KR2010/005284 on Aug. 12, 2010, now Pat. No. 9,351,000.

(51) Int. Cl.

| | | |
|---|---|---|
| *H04N 19/117* | (2014.01) | |
| *H04N 19/157* | (2014.01) | |
| *H04N 19/82* | (2014.01) | |
| *H04N 19/172* | (2014.01) | |
| *H04N 19/184* | (2014.01) | |
| *H04N 19/105* | (2014.01) | |
| *H04N 19/124* | (2014.01) | |
| *H04N 19/13* | (2014.01) | |
| *H04N 19/14* | (2014.01) | |
| *H04N 19/159* | (2014.01) | |
| *H04N 19/51* | (2014.01) | |
| *H04N 19/61* | (2014.01) | |
| *H04N 19/86* | (2014.01) | |
| *H04N 19/119* | (2014.01) | |
| *H04N 19/182* | (2014.01) | |

(52) U.S. Cl.
CPC ......... *H04N 19/117* (2014.11); *H04N 19/119* (2014.11); *H04N 19/124* (2014.11); *H04N 19/13* (2014.11); *H04N 19/14* (2014.11); *H04N 19/157* (2014.11); *H04N 19/159* (2014.11); *H04N 19/172* (2014.11); *H04N 19/184* (2014.11); *H04N 19/51* (2014.11); *H04N 19/61* (2014.11); *H04N 19/82* (2014.11); *H04N 19/86* (2014.11); *H04N 19/865* (2014.11); *H04N 19/182* (2014.11)

(56) References Cited

U.S. PATENT DOCUMENTS

| | | |
|---|---|---|
| 2007/0025448 A1 | 2/2007 | Cha et al. |
| 2008/0075165 A1 | 3/2008 | Ugur et al. |
| 2008/0107176 A1 | 5/2008 | Chatterjee et al. |
| 2008/0232716 A1 | 9/2008 | Plagne |

FOREIGN PATENT DOCUMENTS

| | | |
|---|---|---|
| JP | 3999634 B2 | 8/2007 |
| KR | 100308114 B1 | 8/2001 |
| KR | 20030065277 A | 8/2003 |
| KR | 20030086076 A | 11/2003 |
| KR | 100450836 B1 | 9/2004 |
| KR | 1020050091270 A | 9/2005 |
| WO | 2009047917 A1 | 4/2009 |

OTHER PUBLICATIONS

Communication dated Feb. 22, 2016, issued by the Korean Intellectual Property Office in counterpart Korean Application No. 10-2009-0075336.
Communication dated Jan. 26, 2016, issued by the European Patent Office in counterpart European Application No. 10808362.7.
Communication dated Mar. 13, 2014 issued by the State Intellectual Property Office of P.R. China in counterpart Chinese Application No. 201080036195.5.
Communication dated May 20, 2014 issued by the Japanese Patent Office in counterpart Japanese Patent Application No. 2012-524643.
International Search Report dated Feb. 22, 2011 from the International Searching Authority in counterpart international application No. PCT/KR2010/005284.
J. Kim, et al. Enlarging MB size for high fidelity video coding beyond HD. ITU-T SG16, Video Coding Experts Group (VCEG) VCEG-AJ21, Oct. 5, 2008, pp. 1-6.
Sung-Cheng Lim, et al; "Intra coding using extended block size"; ITU—Telecommunications Standard Sector, Study Group 16 Question 6, Video Coding Experts Group (VCEG); pp. 1-5.
Takeshi Chujoh, et al; "Specification and experimental results of Quadtree-based Adaptive Loop Filter"; ITU—Telecommunications Standardization Sector, Study Group 16 Question 6, Video Coding Experts Group (VCEG); pp. 1-11.
Toshiba Corporation: "Quadtree-based adaptive loop filter Q6/16", ITU-T SG16 Meeting; Jan. 27, 2009-Jun. 2, 2009; Geneva, No. T09-SG16-C-0181, Jan. 29, 2009 (Jan. 29, 2009), XP03003775, ISSN: 0000-0057 (4 pages total).
WJ-Chien and M Karczewics (Qualcomm): "Adaptive Filter Based on Combination of Sum-Modified Laplacian Filter Indexing and Quadtree Partitioning", 38. VCEG Meeting; 89. MPEG Meeting; Jan. 7, 2009-Aug. 7, 2009; London, Geneva; (Video Coding Experts Group of IT-T SG. 16), No. VCEG-AL27, Jul. 3, 2009 (Jul. 3, 2009), XP030003708, ISSN: 0000-0084 (3 pages total).
Written Opinion of the International Searching Authority dated Feb. 22, 2011 from the International Searching Authority in counterpart international application No. PCT/KR2010/005284.

CODING UNITS (1010)

VIDEO CODING AND DECODING METHODS AND VIDEO CODING AND DECODING DEVICES USING ADAPTIVE LOOP FILTERING

CROSS REFERENCE TO RELATED APPLICATIONS

This is a continuation of U.S. application Ser. No. 15/491,112, filed Apr. 19, 2017, which is a continuation of U.S. application Ser. No. 15/293,945, filed Oct. 14, 2016, which is a continuation of U.S. application Ser. No. 15/133,844, filed Apr. 20, 2016, which is a continuation of U.S. application Ser. No. 13/390,350, filed Feb. 14, 2012, which is a national stage entry of International Patent Application No. PCT/KR2010/005284, filed on Aug. 12, 2010, which claims priority from Korean Patent Application No. 10-2009-0075336, filed on Aug. 14, 2009, in the Korean Intellectual Property Office, the disclosures of which are incorporated by reference in their entireties.

FIELD

Apparatuses and methods consistent with exemplary embodiments relate to encoding and decoding video.

BACKGROUND ART

As hardware for reproducing and storing high resolution video content or high quality video content is being developed and supplied, a need for a video coder/decoder ("codec") for effectively encoding or decoding the high resolution video content or high quality video content is increasing. In a conventional video codec, video is encoded according to a limited encoding method, based on a macroblock having a predetermined size. In addition, the conventional video codec uses loop filtering to improve the quality of reproduced image data.

SUMMARY

Apparatuses and methods consistent with exemplary embodiments relate to encoding and decoding of video, according to adaptive loop filtering performed by using continuous one-dimensional (1D) filtering.

According to one aspect of one or more exemplary embodiments, there is provided a method of decoding video. The method includes: receiving and parsing a bitstream which includes encoded video; extracting encoded image data relating to a current picture, which encoded data is assigned to at least one maximum coding unit, information relating to a coded depth and an encoding mode for each of the at least one maximum coding unit, and filter coefficient information for performing loop filtering on the current picture, from the bitstream; decoding the encoded image data in units of the at least one maximum coding unit, based on the information relating to the coded depth and the encoding mode for each of the at least one maximum coding unit; and performing deblocking on the decoded image data relating to the current picture, and performing loop filtering on the deblocked data, by using continuous one-dimensional (1D) filtering.

According to one aspect of one or more exemplary embodiments, there is provided a method for decoding video. The method includes: receiving and parsing a bitstream which includes encoded video; extracting encoded image data relating to a current picture, which encoded data is assigned to at least one maximum coding unit, information relating to a coded depth and an encoding mode for each of the at least one maximum coding unit, and filter coefficient information for performing loop filtering on the current picture, from the bitstream; decoding the encoded image data in units of the at least one maximum coding unit, based on the information relating to the coded depth and the encoding mode for each of the at least one maximum coding unit; and performing deblocking on the decoded image data relating to the current picture, and performing loop filtering on the deblocked data by using continuous one-dimensional (1D) filtering.

The coding unit may be characterized by a maximum size and a depth.

The depth denotes the number of times a coding unit is hierarchically split, and as the depth increases, deeper coding units according to depths may be split from the maximum coding unit to obtain minimum coding units. The depth is increased from an upper depth to a lower depth. As the depth increases, the number of times that the maximum coding unit is split increases, and a total number of possible times that the maximum coding unit may be split corresponds to a maximum depth. The maximum size and the maximum depth of the coding unit may be predetermined.

The extracting of the encoded image data, the information relating to the coded depth and the encoding mode, and the filter coefficient information may include extracting residual information relating to respective differences between corresponding pairs of continuous filter coefficients of each of a plurality of 1D filters.

The performing of the loop filtering may include successively performing 1D filtering in a horizontal direction and then in a vertical direction to restore the current picture.

The performing of the loop filtering may include deriving a filter coefficient of each of the plurality of 1D filters, based on the residual information; and performing the successive 1D filtering by using the derived filter coefficient of each of the plurality of 1D filters.

The deriving of the filter coefficient of each of the plurality of 1D filters may include calculating a current filter coefficient of a respective one of the plurality of 1D filters by adding a respective difference between the current filter coefficient and a corresponding previous filter coefficient of the respective one of the plurality of 1D filters to the corresponding previous filter coefficient.

The performing of the loop filtering may include filtering nine pieces of continuous data arranged in a horizontal direction from among the deblocked data by using five horizontal 1D filter coefficients; and filtering nine pieces of continuous data arranged in a vertical direction from among the deblocked data by using five vertical 1D filter coefficients.

According to another aspect of one or more exemplary embodiments, there is provided a method for encoding video. The method includes: assigning at least one region of a current picture into at least one maximum coding unit; determining a coded depth at which to output a final encoding result according to at least one split region, which is divided from one of the at least one region of the at least one maximum coding unit, by encoding the at least one split region according to depths, wherein each of the depths is proportional to a number of times that the one of the at least one region of the at least one maximum coding unit is split; and encoding and outputting image data, which is a final result of encoding the at least one split region, encoding information relating to the coded depth and a prediction mode, and encoding filter coefficient information relating to loop filtering performed by using continuous one-dimensional (1D) filtering after deblocking is performed during encoding of the current picture, in units of the at least one maximum coding unit.

The outputting of the filter coefficient information relating to the loop filtering may include encoding a respective difference between a current filter coefficient of a respective one of the plurality of 1D filters and a previous filter coefficient of the respective one of the plurality of 1D filters as the residual information for each of the plurality of 1D filters.

The at least one maximum coding unit may include a coding unit which corresponds to a respective one of the depths, each of which is obtained by hierarchically splitting the at least one maximum coding unit according to at least one depth. Each coding unit corresponding to an upper depth may include a plurality of coding units which correspond to respective lower depths. The coded depth may be a depth having the least encoding error from among at least one coded depth that is hierarchically split from the at least one maximum coding unit.

According to another aspect of one or more exemplary embodiments, there is provided an apparatus for decoding video. The apparatus includes: a receiver which receives and parses a bitstream which includes encoded video; an extractor which extracts encoded image data relating to a current picture, which image data is assigned to at least one maximum coding unit, information relating to a coded depth and an encoding mode for each of the at least one maximum coding unit, and filter coefficient information for performing loop filtering on the current picture, from the bitstream; an image data decoder which decodes the encoded image data in units of the at least one maximum coding unit, based on the information relating to the coded depth and the encoding mode for each of the at least one maximum coding unit; and a loop filtering performing unit which performs deblocking on the decoded image data relating to the current picture, and which performs loop filtering on the deblocked data by using continuous one-dimensional (1D) filtering.

According to another aspect of one or more exemplary embodiments, there is provided an apparatus for encoding video. The apparatus includes: a maximum coding unit splitter which assigns at least one region of a current picture into at least one maximum coding unit; a coded depth determiner which determines a coded depth at which to output a final encoding result according to at least one split region, which is divided from the at least one region of the at least one maximum coding unit, by encoding the at least one split region according to depths, wherein each of the depths is proportional to a number of times a region of the at least one maximum coding unit is split; and an output unit which encodes and outputs image data, which is a final result of encoding the at least one split region, encoding information relating to the coded depth and a prediction mode, and filter coefficient information relating to loop filtering performed by using continuous one-dimensional (1D) filtering after deblocking is performed during encoding of the current picture, in units of the at least one maximum coding unit.

According to another aspect of one or more exemplary embodiments, there is provided a non-transitory computer readable recording medium having recorded thereon a computer program for executing the method for encoding video.

According to another aspect of one or more exemplary embodiments, there is provided a non-transitory computer readable recording medium having recorded thereon a computer program for executing the method for decoding video.

DETAILED DESCRIPTION OF THE EXEMPLARY EMBODIMENTS

Hereinafter, a method and apparatus for encoding video and a method and apparatus for decoding video according to exemplary embodiments will be described more fully with reference to the accompanying drawings. Specifically, encoding and decoding of video, which is performed based on spatially hierarchical data units, according to exemplary embodiments, will be described with reference to FIGS. 1 to 15 below. Encoding and decoding of video, which is performed based on spatially hierarchical data units and by using adaptive loop filtering, will be described with reference to FIGS. 16 to 21 below.

In the present specification, an "image" should be understood as an inclusive term that may denote not only a still image but also a moving image, such as, for example, video.

A method and apparatus for encoding video and a method and apparatus for decoding video according to exemplary embodiments will now be described with reference to FIGS. 1 to 15.

Figure 1:
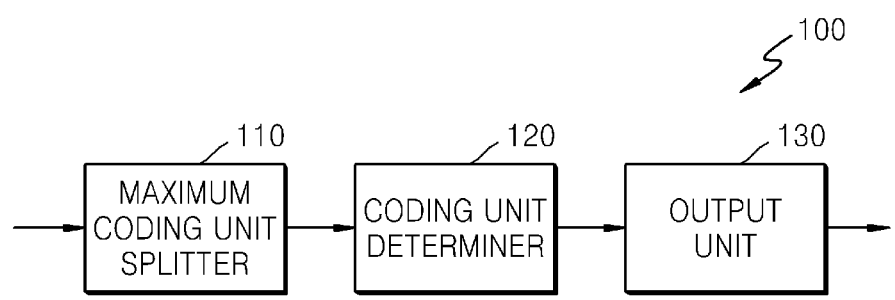
FIG. 1 is a block diagram of a video encoding apparatus, according to an exemplary embodiment.

FIG. 1 is a block diagram of a video encoding apparatus 100, according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data included in the current picture may be split into the at least one maximum coding unit. The maximum coding unit according to an exemplary embodiment may be, for example, a data unit having a size of 32×32, 64×64, 128×128, 256×256, such that a shape of the data unit is a square having a width and height which are equal to a power of two. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper coding units according to depths may be split from the maximum coding unit to a minimum coding unit. A depth of the maximum coding unit is an uppermost depth, and a depth of the minimum coding unit is a lowermost depth. Because a size of a coding unit corresponding to each depth decreases as the depth of the maximum coding unit increases, a coding unit corresponding to an upper depth may include a plurality of coding units corresponding to lower depths.

As described above, the image data relating to the current picture is split into the maximum coding units according to a maximum size of the coding unit, and each of the maximum coding units may include deeper coding units that are split according to depths. Because the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth at which to output a finally encoded image data according to the at least one split region. In particular, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally outputted. In addition, the coding units corresponding to the coded depth may be regarded as encoded coding units.

The determined coded depth and the encoded image data according to the determined coded depth are outputted to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split in a similar manner as a coding unit is hierarchically split according to depths, and as the number of coding units increases. In addition, even if coding units correspond to the same depth in one maximum coding unit, it is determined whether to split each of the coding units corresponding to the same depth to a lower depth by separately measuring an encoding error of the image data of the each coding unit. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The "coding units having a tree structure" according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth, according to an exemplary embodiment, is an index related to the number of splitting times from a maximum coding unit to a minimum coding unit. A first maximum depth, according to an exemplary embodiment, may denote the total number of splitting times from the maximum coding unit to the minimum coding unit. A second maximum depth, according to an exemplary embodiment, may denote the total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. In particular, if the minimum coding unit is a coding unit in which the maximum coding unit is split four times, five depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation may also be performed based on the deeper coding units according to a depth equal to or depths less than the maximum depth, according to the maximum coding unit.

Because the number of deeper coding units increases whenever the maximum coding unit is split according to depths, encoding including the prediction encoding and the transformation may be performed on all of the deeper coding units generated as the depth increases. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed, and the same data unit may be used for all operations, or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will be referred to as a "prediction unit." A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be equal to, for example, 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. In addition, the skip mode may be performed only on the partition of 2N×2N. The encoding may be independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will hereinafter be referred to as a "transformation unit." Similar to the coding unit, the transformation unit in the coding unit may be recursively split into smaller-sized regions, so that residual data in the coding unit may be divided according to the transformation units having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be equal to zero when the size of a transformation unit is also 2N×2N, may be equal to one when the size of the transformation unit is thus N×N, and may be equal to two when the size of the transformation unit is thus N/2×N/2. Accordingly, the transformation units having the tree structure may be determined according to transformation depths. Encoding information according to coding units corresponding to a coded depth requires not only information relating to the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to one or more exemplary embodiments, will be described in detail later with reference to FIGS. 3 through 12.

The coding unit determiner 120 may measure an encoding error of deeper coding units according to depths by using, for example, Rate-Distortion Optimization based on Lagrangian multipliers.

The output unit 130 outputs the image data of the maximum coding unit, which is encoded based on the at least one coded depth determined by the coding unit determiner 120, and information relating to the encoding mode according to the coded depth, in bitstreams.

The encoded image data may be obtained by encoding residual data relating to an image.

The information relating to the encoding mode according to coded depth may include information relating to the coded depth, and/or information relating to the partition type in the prediction unit, the prediction mode, and the size of the transformation unit.

The information relating to the coded depth may be defined by using split information according to depths, which indicates whether encoding is performed on coding units of a lower depth instead of a current depth. If the current depth of the current coding unit is the coded depth, image data in the current coding unit is encoded and outputted, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Because at least one coding unit of the lower depth exists in one coding unit of the current depth, the encoding is repeatedly performed on each coding unit of the lower depth, and thus the encoding may be recursively performed for the coding units having the same depth.

Because the coding units having a tree structure are determined for one maximum coding unit, and information relating to at least one encoding mode is determined for a coding unit of a coded depth, information relating to at least one encoding mode may be determined for one maximum coding unit. In addition, a coded depth of the image data of the maximum coding unit may vary based on location, because the image data is hierarchically split according to depths, and thus information relating to the coded depth and the encoding mode may be set for the image data.

Accordingly, the output unit 130 may assign encoding information relating to a corresponding coded depth and an encoding mode to at least one of the coding unit, the prediction unit, and a minimum unit included in the maximum coding unit.

The minimum unit, according to an exemplary embodiment, is a rectangular data unit obtained by splitting the minimum coding unit constituting the lowermost depth by four. Alternatively, the minimum unit may be a maximum rectangular data unit that may be included in all of the coding units, prediction units, partition units, and transformation units included in the maximum coding unit.

For example, the encoding information outputted through the output unit 130 may be classified into encoding information according to coding units, and encoding information according to prediction units. The encoding information according to the coding units may include the information relating to the prediction mode and information relating to the size of the partitions. The encoding information according to the prediction units may include information relating to an estimated direction of an inter mode, information relating to a reference image index of the inter mode, information relating to a motion vector, information relating to a chroma component of an intra mode, and information relating to an interpolation method of the intra mode. In addition, information relating to a maximum size of the coding unit defined according to pictures, slices, or groups of pictures (GOPs), and information relating to a maximum depth may be inserted into a Sequence Parameter Set (SPS) or a header of a bitstream.

In the video encoding apparatus 100, the deeper coding unit may be a coding unit obtained by dividing a height or width of a coding unit of an upper depth, which is one layer above, by two. In particular, when the size of the coding unit of the current depth is 2N×2N, the size of the coding unit of the lower depth may be equal to N×N. In addition, the coding unit of the current depth having the size of 2N×2N may include a maximum of four coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth, which may be determined by considering characteristics of the current picture. In addition, because encoding may be performed on each maximum coding unit by using any one of various prediction modes and transformations, an optimum encoding mode may be determined by considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it may become difficult to transmit the compressed information, and data compression efficiency may decrease. However, by using the video encoding apparatus 100, image compression efficiency may be increased, because a coding unit is adjusted based on considering characteristics of an image relating to increasing a maximum size of a coding unit based on considering a size of the image.

Figure 2:
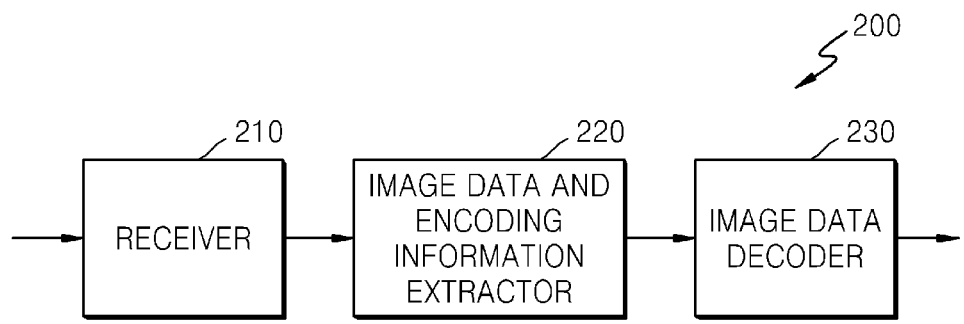
FIG. 2 is a block diagram of a video decoding apparatus, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information relating to various encoding modes for various operations of the video decoding apparatus 200, are identical to those described with reference to FIG. 1 and the video encoding apparatus 100.

The receiver 210 receives and parses a bitstream which includes an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information relating to a maximum size of a coding unit of a current picture, from a header relating to the current picture or SPS.

Further, the image data and encoding information extractor 220 extracts information relating to a coded depth and an encoding mode for the coding units having a tree structure according to each maximum coding unit from the parsed bitstream. The extracted information relating to the coded depth and the encoding mode is outputted to the image data decoder 230. In particular, the image data included in a bit stream is split into the maximum coding unit such that the image data decoder 230 decodes the image data for each maximum coding unit.

The information relating to the coded depth and the encoding mode according to the maximum coding unit may be set for information relating to at least one coding unit corresponding to the coded depth, and information relating to an encoding mode may include information relating to a partition type of a corresponding coding unit corresponding to the coded depth, information relating to a prediction mode, and information relating to a size of a transformation unit. In addition, splitting information according to depths may be extracted as the information relating to the coded depth.

The information relating to the coded depth and the encoding mode according to each maximum coding unit extracted by the image data and encoding information extractor 220 is information relating to a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Because encoding information relating to the coded depth and the encoding mode may be assigned to a predetermined data unit from among a corresponding coding unit, a prediction unit, and a minimum unit, the image data and encoding information extractor 220 may extract the information relating to the coded depth and the encoding mode according to the predetermined data units. The predetermined data units to which the same information relating to the coded depth and the encoding mode is assigned may be inferred to be the data units included in the same maximum coding unit.

The image data decoder 230 restores the current picture by decoding the image data in each maximum coding unit based on the information relating to the coded depth and the encoding mode according to the maximum coding units. In particular, the image data decoder 230 may decode the encoded image data based on the extracted information relating to the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information relating to the partition type and the prediction mode of the prediction unit of the coding unit according to coded depths.

Further, the image data decoder 230 may perform inverse transformation according to each transformation unit in the coding unit, based on the information relating to the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information relating to the partition type of the prediction unit, the prediction mode, and the size of the transformation unit for each coding unit corresponding to the coded depth, and output the image data of the current maximum coding unit.

In particular, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information relating to at least one coding unit that generates the minimum encoding error when encoding is recursively performed for each maximum coding unit, and may use the information to decode the current picture. In particular, the coding units having the tree structure determined to be the optimum coding units in each maximum coding unit may be decoded. In addition, the maximum size of coding unit may be determined by considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information relating to an optimum encoding mode received from an encoder.

A method for determining coding units having a tree structure, a prediction unit, and a transformation unit, according to an exemplary embodiment, will now be described with reference to FIGS. 3 through 15.

Figure 3:
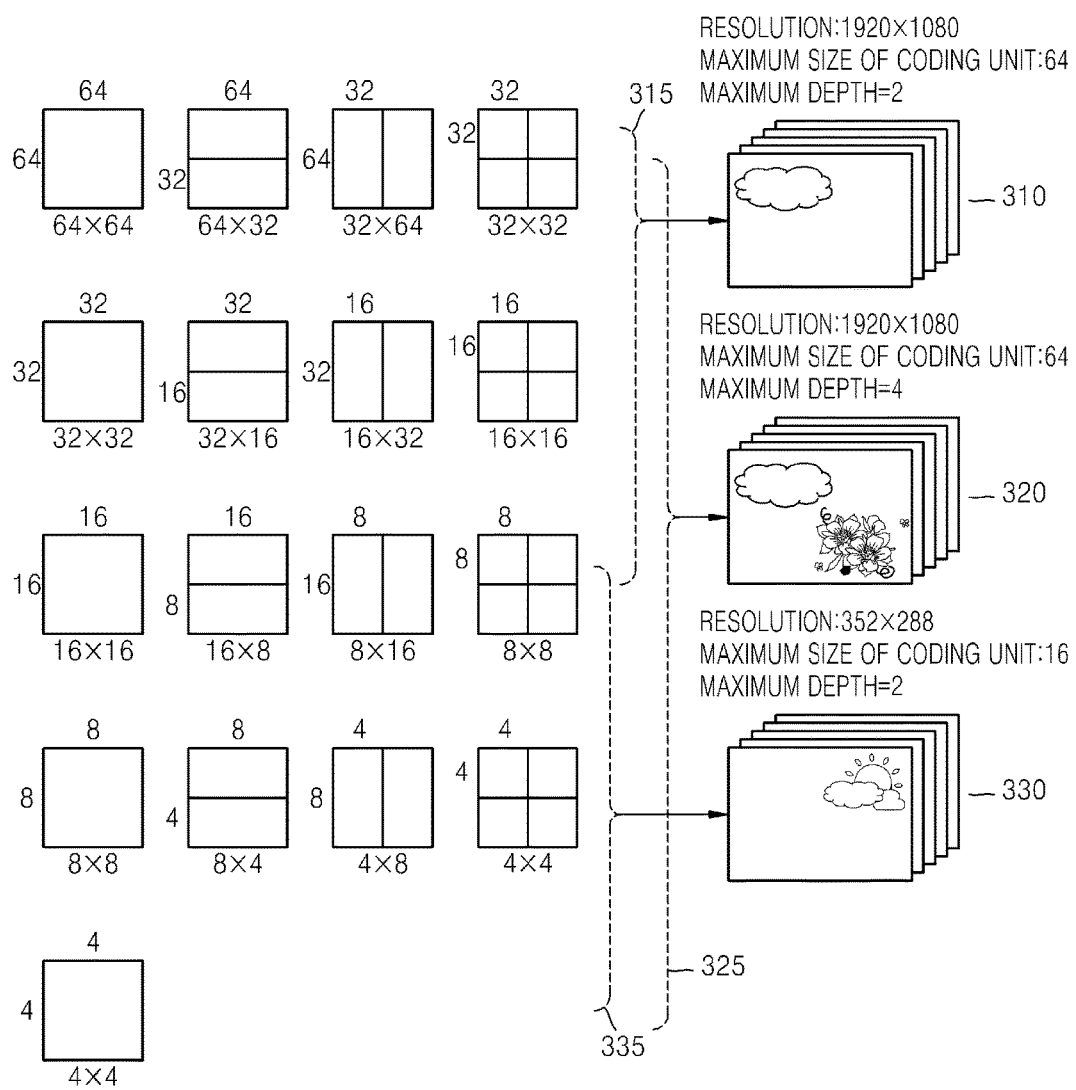
FIG. 3 is a diagram which illustrates a concept of coding units according to an exemplary embodiment.

FIG. 3 is a diagram which illustrates a concept of coding units according to an exemplary embodiment.

A size of a coding unit may be expressed as width×height, and may be equal to, for example, one of 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16. A coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is equal to 64, and a maximum depth is equal to 2. In video data 320, a resolution is 1920×1080, a maximum size of a coding unit is equal to 64, and a maximum depth is equal to 4. In video data 330, a resolution is 352×288, a maximum size of a coding unit is equal to 16, and a maximum depth is equal to 2. Each maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be equal to 64.

Because the maximum depth of the video data 310 is equal to 2, coding units 315 of the video data 310 may include a maximum coding unit having a long axis size of 64, and coding units having long axis sizes of 32 and 16, because depths are increased to two layers by splitting the maximum coding unit twice. Further, because the maximum depth of the video data 330 is equal to 2, coding units 335 of the video data 330 may include a maximum coding unit having a long axis size of 16, and coding units having a long axis size of 8 and 4, because depths are increased to two layers by splitting the maximum coding unit twice.

Because the maximum depth of the video data 320 is 4, coding units 325 of the video data 320 may include a maximum coding unit having a long axis size of 64, and coding units having long axis sizes of 32, 16, 8, and 4, because the depths are increased to 4 layers by splitting the maximum coding unit four times. As a depth increases, detailed information may be more precisely expressed.

Figure 4:
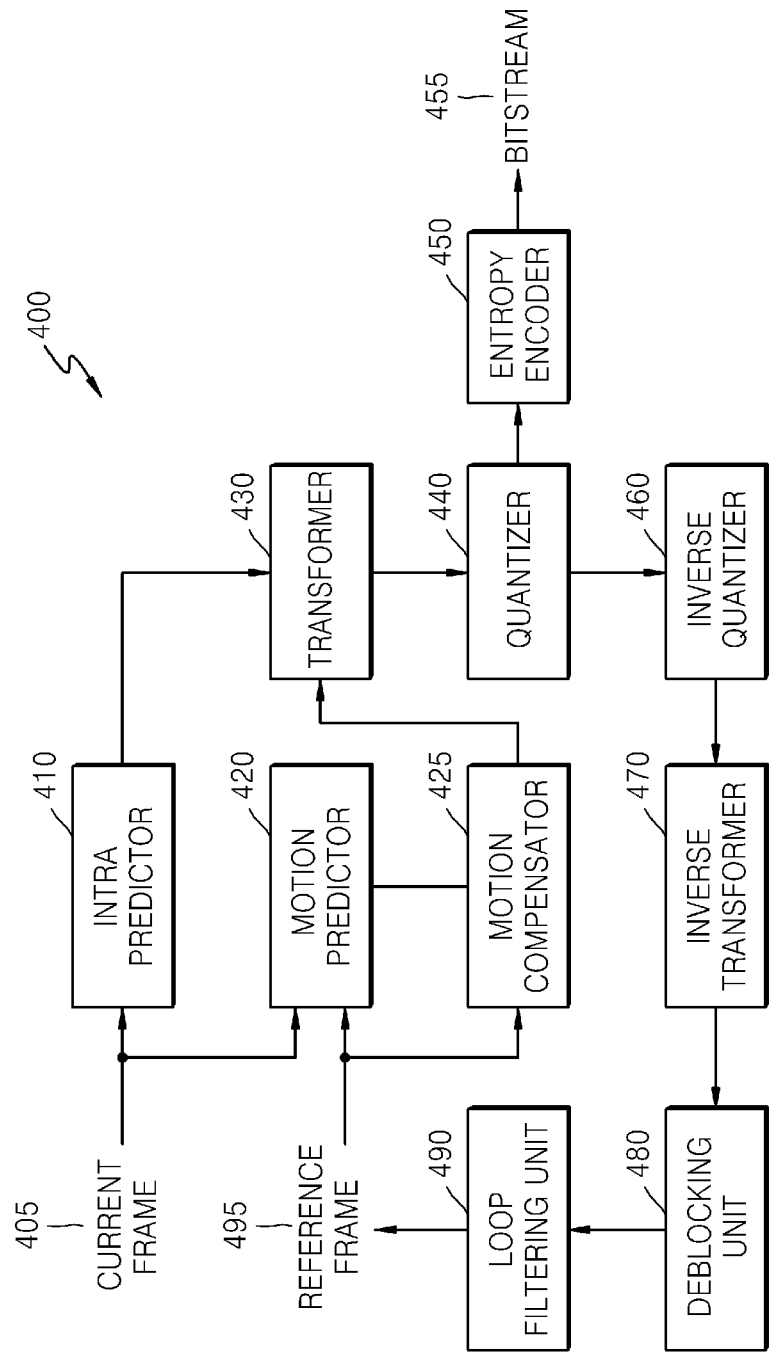
FIG. 4 is a block diagram of an image encoder based on coding units according to an exemplary embodiment.

FIG. 4 is a block diagram of an image encoder 400 based on coding units, according to an exemplary embodiment.

The image encoder 400 performs similar operations as those performed by the coding unit determiner 120 of the video encoding apparatus 100 for encoding image data. In particular, an intra predictor 410 performs intra prediction on coding units in an intra mode, from among a current frame 405, and a motion predictor 420 and a motion compensator 425 respectively perform inter estimation and motion compensation on coding units in an inter mode from among the current frame 405 by using the current frame 405 and a reference frame 495.

Data outputted from the intra predictor 410, the motion predictor 420, and the motion compensator 425 is outputted as a quantized transformation coefficient through a transformer 430 and a quantizer 440. The quantized transformation coefficient is restored as data in a spatial domain via operations performed by an inverse quantizer 460 and an inverse transformer 470, and the restored data in the spatial domain is outputted as the reference frame 495 after being post-processed by each of a deblocking unit 480 and a loop filtering unit 490. The quantized transformation coefficient may be outputted as a bitstream 455 via an entropy encoder 450.

In order for the image encoder 400 to be applied in the video encoding apparatus 100, all elements of the image encoder 400, i.e., the intra predictor 410, the motion predictor 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure and based on the maximum depth of each maximum coding unit.

In particular, the each of intra predictor 410, the motion predictor 420, and the motion compensator 425 determines partitions and a prediction mode of each coding unit from among the coding units having a tree structure based on the maximum size and the maximum depth of a current maximum coding unit, and the transformer 430 determines the size of the transformation unit in each coding unit from among the coding units having a tree structure.

Figure 5:
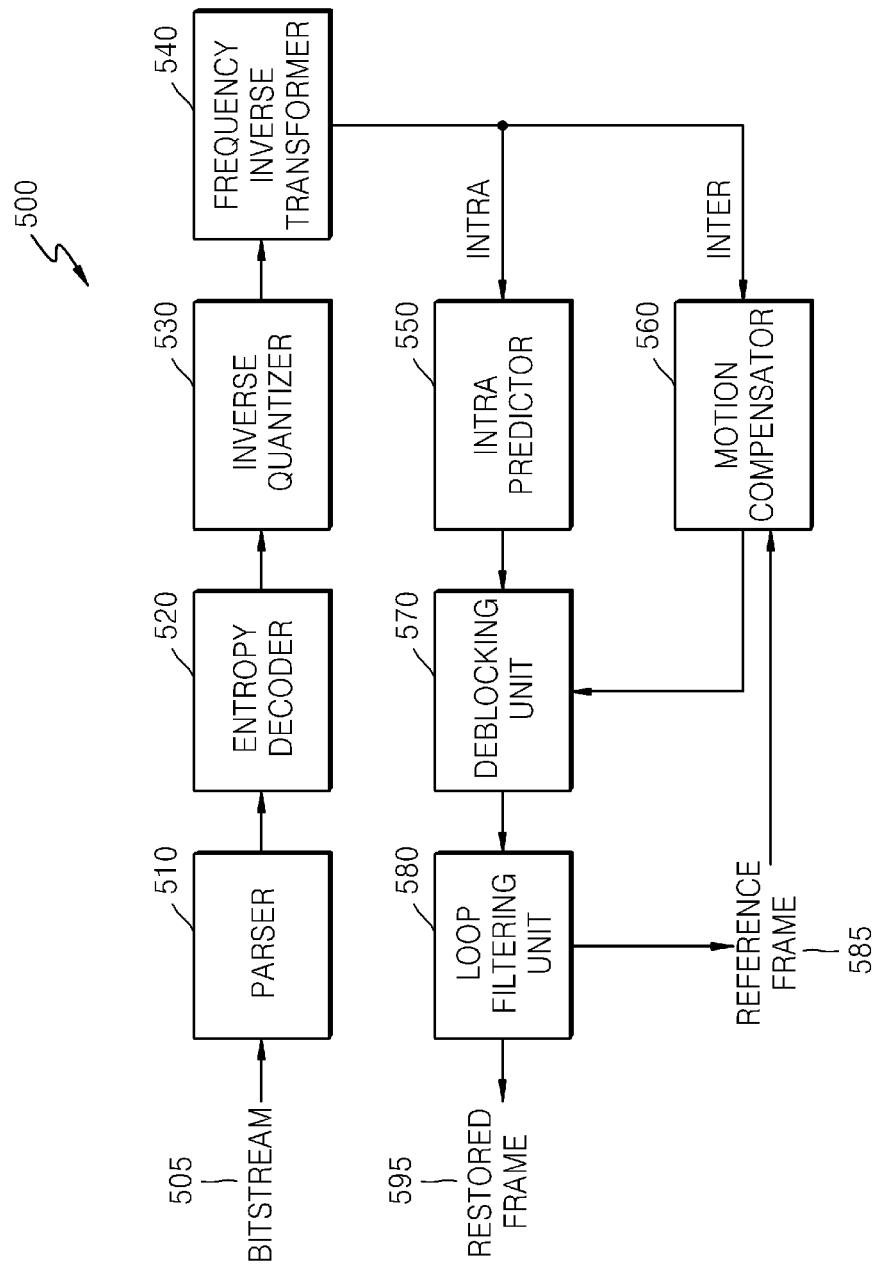
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information relating to encoding required for decoding from a bitstream 505. The encoded image data is outputted as inverse quantized data via operations performed by an entropy decoder 520 and an inverse quantizer 530, and the inverse quantized data is restored to image data in a spatial domain via an operation performed by an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, having passed through the intra predictor 550 and the motion compensator 560, may be outputted as a restored frame 595 after being post-processed by a deblocking unit 570 and a loop filtering unit 580. In addition, the image data that is post-processed by the deblocking unit 570 and the loop filtering unit 580 may be outputted as the reference frame 585.

In order to decode the image data in the image data decoder 230 of the video decoding apparatus 200, the image decoder 500 may perform operations that are performed after completion of operations performed by the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

In particular, each of the intra predictor 550 and the motion compensator 560 performs operations based on partitions and a prediction mode for each of the coding units having a tree structure, and the inverse transformer 540 performs operations based on a size of a transformation unit for each coding unit.

Figure 6:
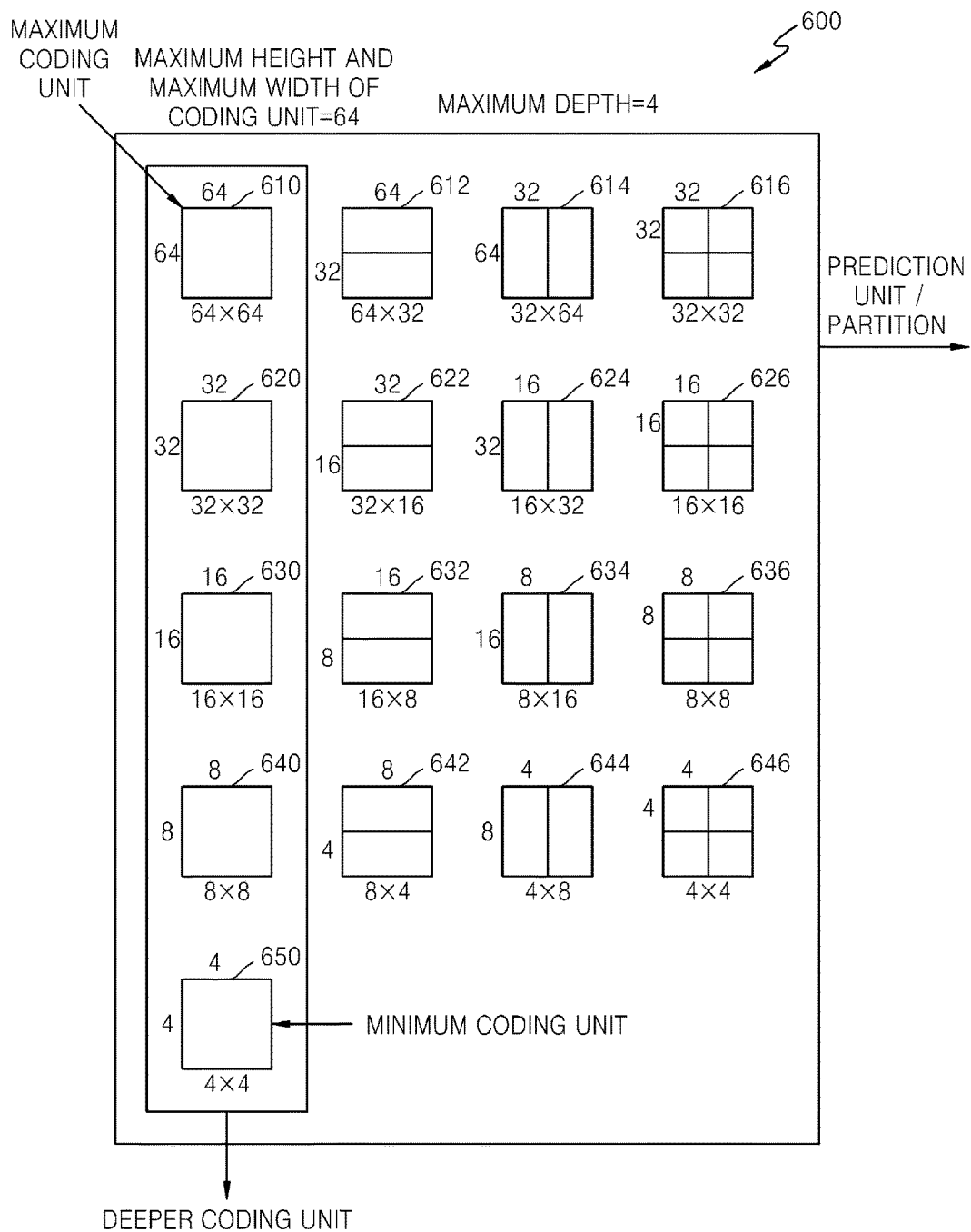
FIG. 6 is a diagram which illustrates deeper coding units according to depths and partitions, according to an exemplary embodiment.

FIG. 6 is a diagram which illustrates deeper coding units according to depths and partitions, according to an exemplary embodiment.

The video encoding apparatus 100 and the video decoding apparatus 200 use hierarchical coding units so as to consider characteristics of an image. A maximum height, a maximum width, and a maximum depth of each of respective coding units may be adaptively determined according to the characteristics of the image, or may be variably set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each equal to 64, and the maximum depth is equal to 4. Because a depth increases along a vertical axis of the hierarchical structure 600, a height and a width of the deeper coding unit are each split. In addition, a prediction unit and partitions, which are bases for prediction encoding of each deeper coding unit, are shown along a horizontal axis of the hierarchical structure 600.

In particular, a coding unit 610 is a maximum coding unit in the hierarchical structure 600, wherein a depth is equal to zero and a size, i.e., a height by width specification, is 64×64. The depth increases along the vertical axis, and thus, a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In particular, if the coding unit 610 having the size of 64×64 and the depth of 0 is a prediction unit, the prediction unit may be split into partitions included in the coding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, or partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, or partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, or partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth increases along the vertical axis of the hierarchical structure 600. A depth and a partition having the minimum encoding error in the coding unit 610 may be selected as the coded depth and a partition type of the coding unit 610.

Figure 7:
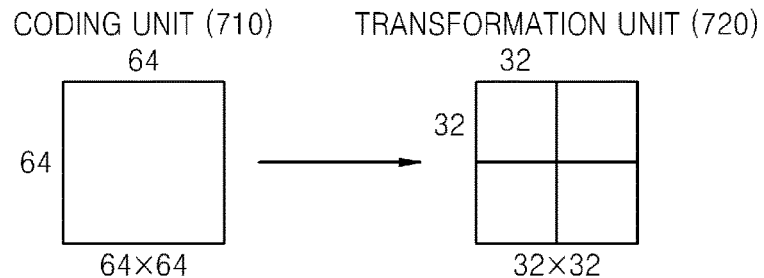
FIG. 7 is a diagram which illustrates a relationship between a coding unit and transformation units, according to an exemplary embodiment.

FIG. 7 is a diagram which illustrates a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Further, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
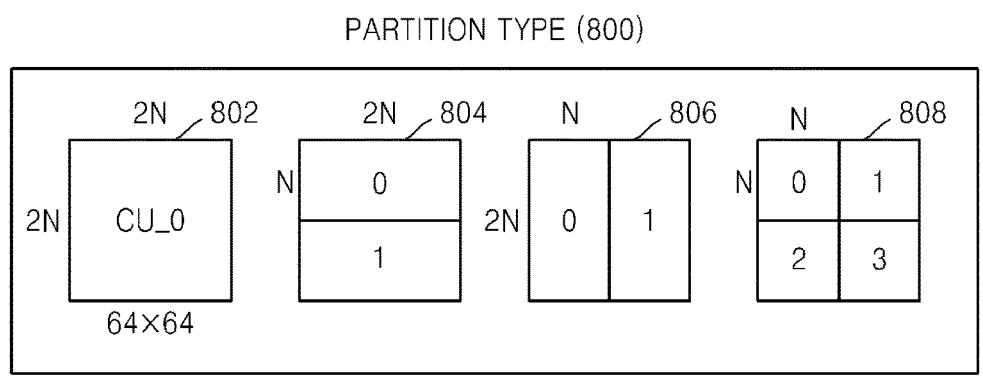
FIG. 8 is a diagram which illustrates encoding information relating to coding units corresponding to a coded depth, according to an exemplary embodiment.
Figure 8:
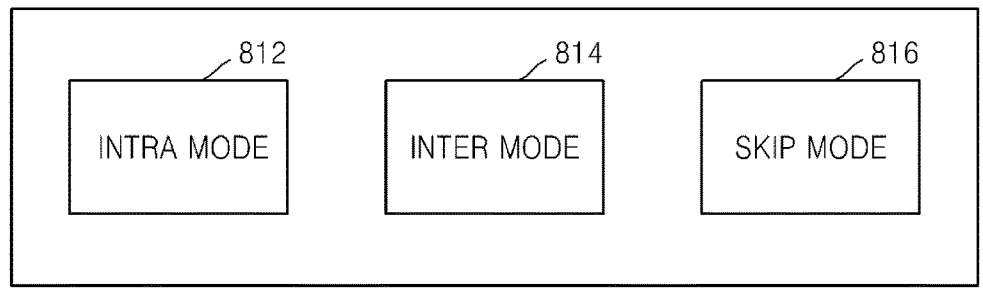
Figure 8:
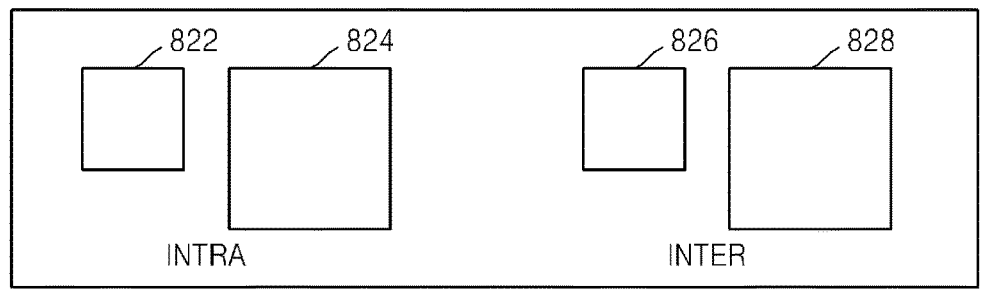

FIG. 8 is a diagram which illustrates encoding information relating to coding units corresponding to a coded depth, according to an exemplary embodiment.

The output unit 130 of the video encoding apparatus 100 may encode and transmit information 800 relating to a partition type, information 810 relating to a prediction mode, and information 820 relating to a size of a transformation unit for each coding unit corresponding to a coded depth, as information relating to an encoding mode.

The information 800 indicates information relating to a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In particular, the information 800 relating to a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 9:
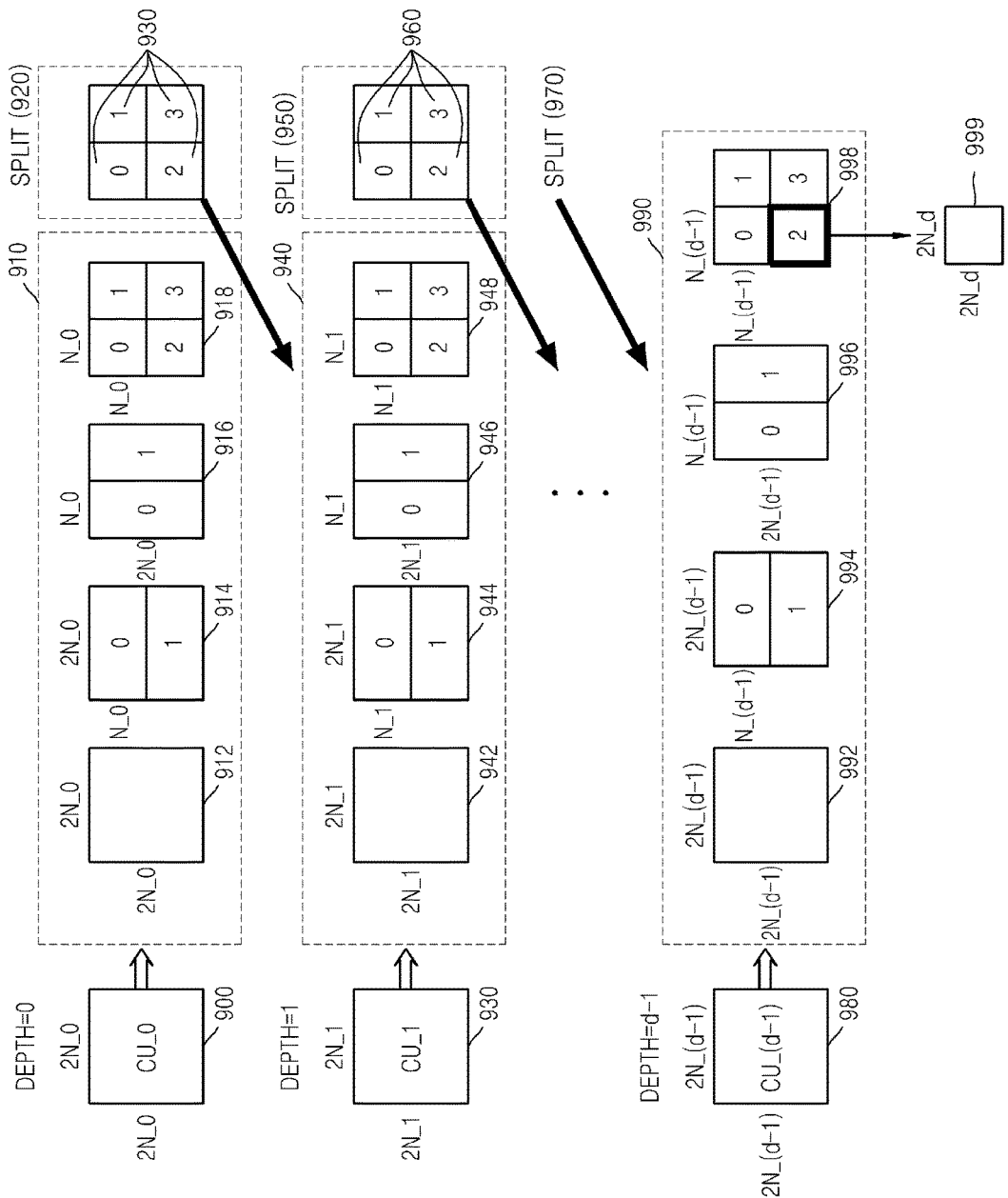
FIG. 9 is a diagram which illustrates deeper coding units according to depths, according to an exemplary embodiment.

FIG. 9 is a diagram which illustrates deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding, including the prediction encoding, in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In particular, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), or four partitions having a size of N_(d−1)×N_(d−1) from among the partition types 992 through 998 to search for a partition type having a minimum encoding error.

Even when the partition type 998 has the minimum encoding error, because a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). In addition, because the maximum depth is d and a minimum coding unit 980 having a lowermost depth of d−1 is no longer split to a lower depth, split information for the minimum coding unit 980 is not set.

A data unit 999 may be a "minimum unit" for the current maximum coding unit. A minimum unit according to an exemplary embodiment may be a rectangular data unit obtained by splitting a minimum coding unit 980 by four. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

Accordingly, the minimum encoding errors according to depths are compared in all of the depths of 1 through d, and a depth having the least encoding error may be determined as a coded depth. The coded depth, the partition type of the prediction unit, and the prediction mode may be encoded and transmitted as information relating to an encoding mode. In addition, because a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information relating to the coded depth and the prediction unit of the coding unit 900 to decode the partition 912. The video decoding apparatus 200 may determine a depth, in which split information is equal to 0, as a coded depth by using split information according to depths, and use information relating to an encoding mode of the corresponding depth for decoding.

Figure 10:
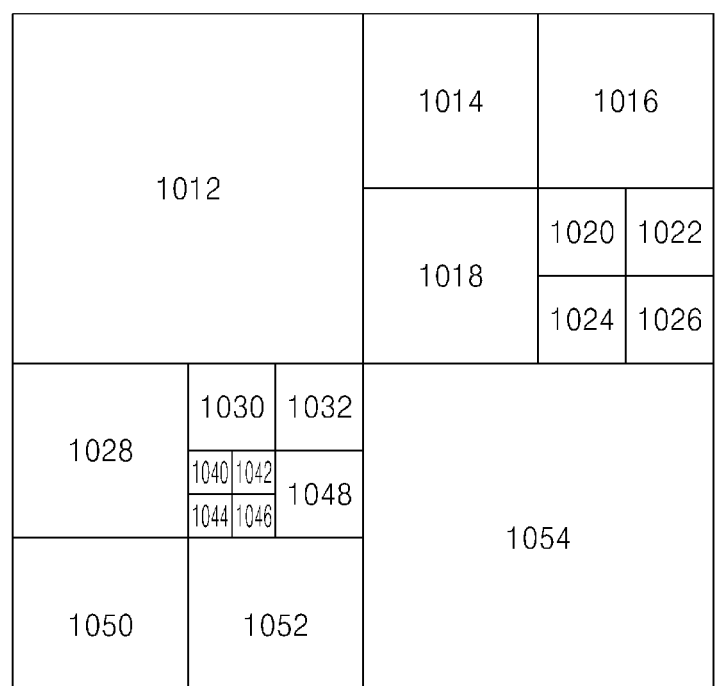
FIGS. 10, 11, and 12 are diagrams which illustrate a relationship between coding units, prediction units, and transformation units, according to an exemplary embodiment.
Figure 11:
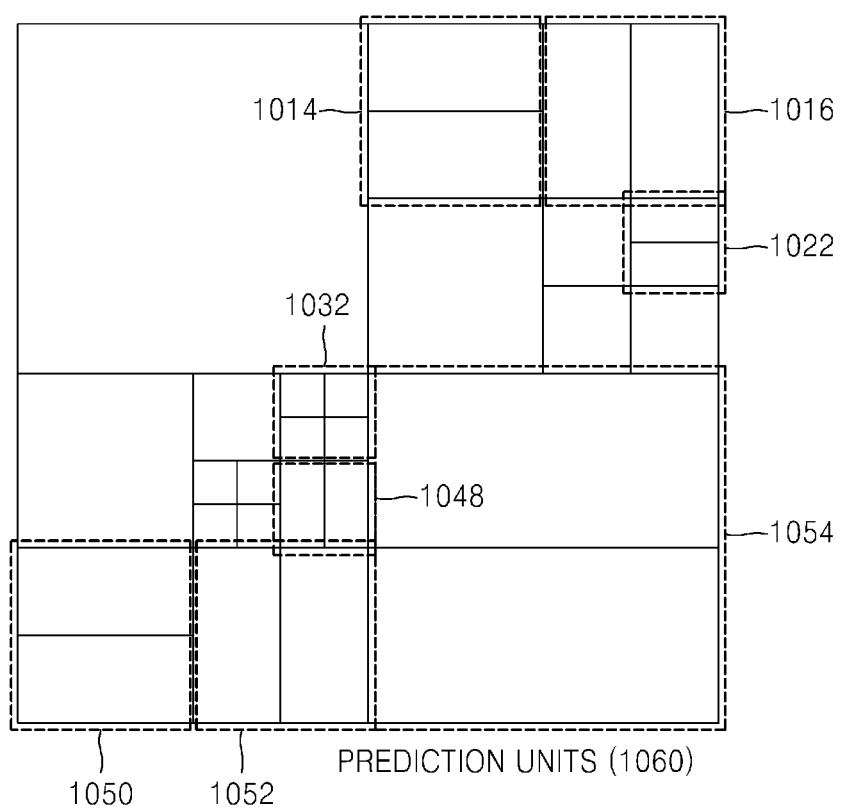
Figure 12:
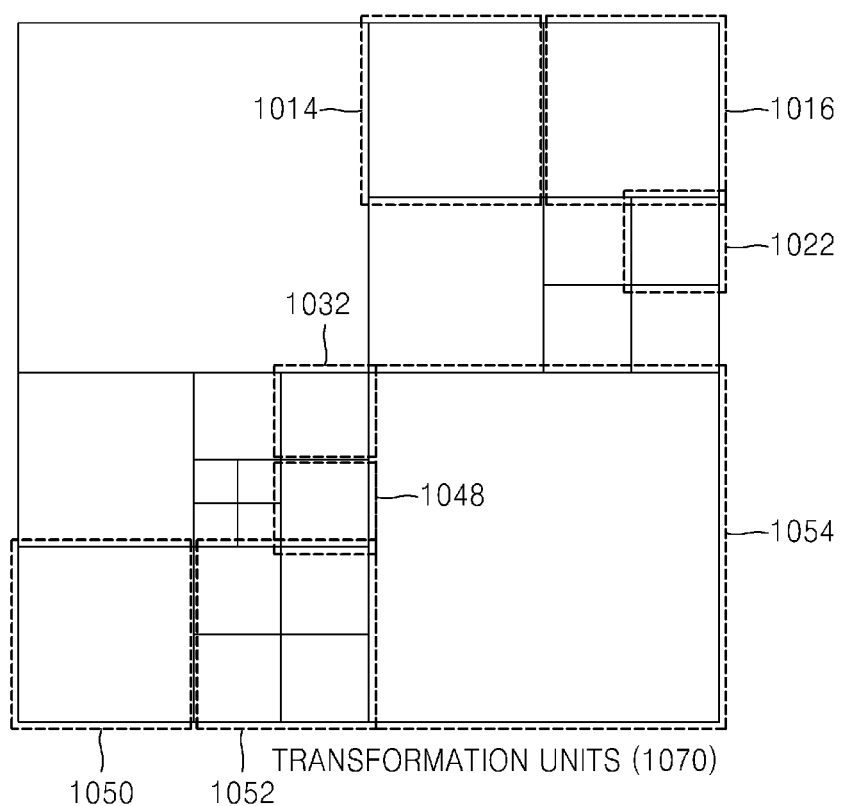

FIGS. 10, 11, and 12 are diagrams which illustrate a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is equal to 0 in the coding units 1010, depths of coding units 1012 and 1054 are equal to 1, depths of coding units 1014, 1016, 1018, 1028, 1050, and 1052 are equal to 2, depths of coding units 1020, 1022, 1024, 1026, 1030, 1032, and 1048 are equal to 3, and depths of coding units 1040, 1042, 1044, and 1046 are equal to 4.

In the prediction units 1060, some coding units 1014, 1016, 1022, 1032, 1048, 1050, 1052, and 1054 are obtained by splitting the coding units in the coding units 1010. In particular, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. In addition, the coding units 1014, 1016, 1022, 1032, 1048, 1050, and 1052 in the transformation units 1070 are different from those in the prediction units 1060 with respect to sizes and shapes. In particular, the video encoding and decoding apparatuses 100 and 200 may perform intra prediction, motion prediction, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information relating to a coding unit, information relating to a partition type, information relating to a prediction mode, and information relating to a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| | | | Size of Transformation Unit | | |
|---|---|---|---|---|---|
| Prediction Mode | Partition Type | | Split Information 0 of Transformation Unit | Split Information 1 of Transformation Unit | Split Information 1 |
| | Symmetrical Partition Type | Asymmetrical Partition Type | | | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information relating to the coding units having a tree structure, and the image data and encoding information extractor 220 of the video decoding apparatus 200 may extract the encoding information relating to the coding units having a tree structure from a received bitstream.

Split information indicates whether a current coding unit is split into coding units of a lower depth. If split information of a current depth d is equal to 0, a depth in which a current coding unit is no longer split into a lower depth is a coded depth, and thus information relating to a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information relating to the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit by ratios of 1:3 and 3:1, and the asymmetrical partition types having the sizes of nL×2N and nR×2N may be respectively obtained by splitting the width of the prediction unit by ratios of 1:3 and 3:1

The size of the transformation unit may be set to be two types in the intra mode and two types in the inter mode. In particular, if split information of the transformation unit is equal to 0, the size of the transformation unit may be 2N×2N, which is the size of the current coding unit. If split information of the transformation unit is equal to 1, the transformation units may be obtained by splitting the current coding unit. Further, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information relating to coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. In addition, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
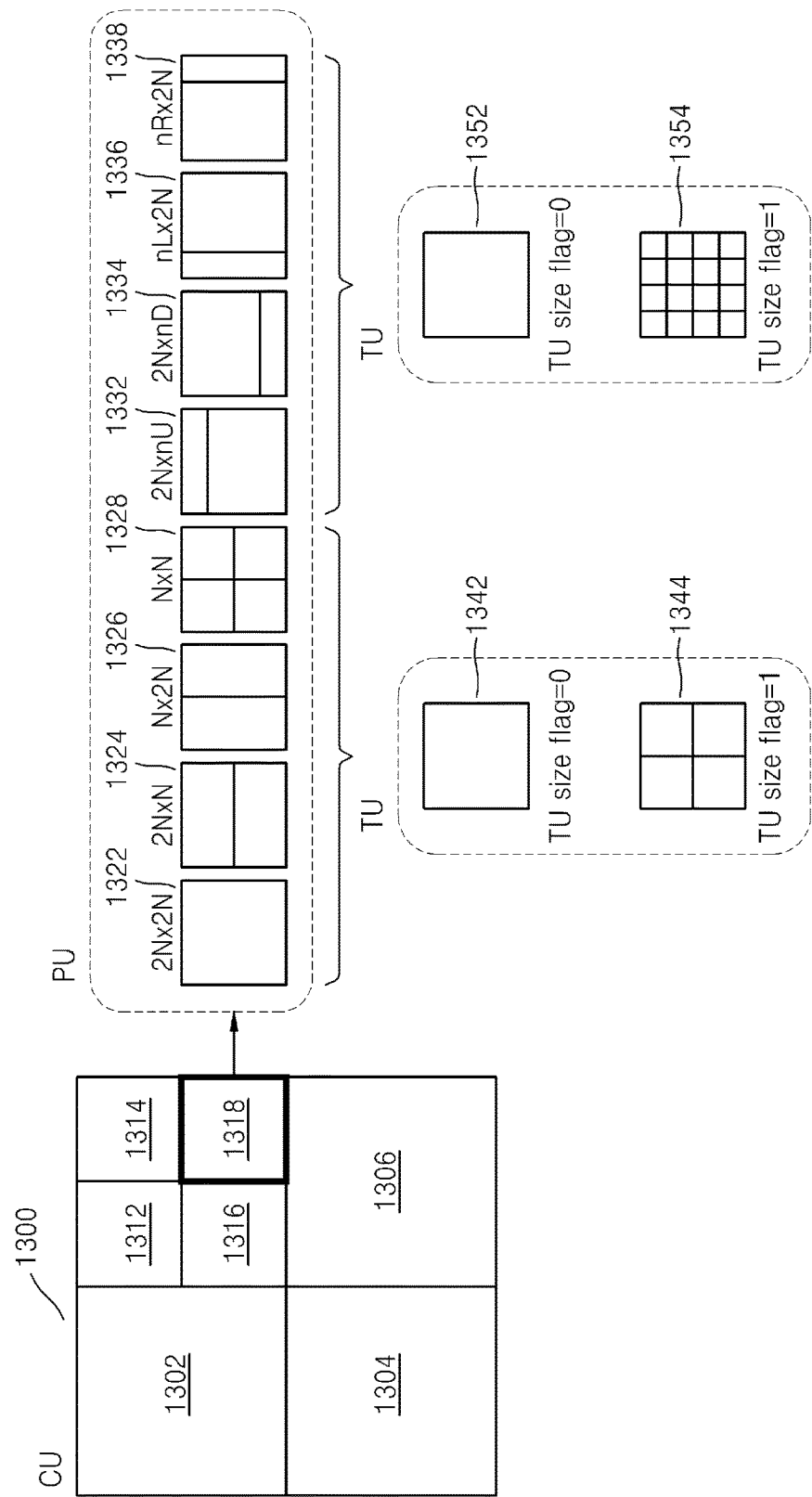
FIG. 13 is a diagram which illustrates a relationship between a coding unit, a prediction unit or a partition, and a transformation unit, based on encoding mode information provided in Table 1, according to an exemplary embodiment.

FIG. 13 is a diagram which illustrates a relationship between a coding unit, a prediction unit or a partition, and a transformation unit, according to encoding mode information included in Table 1.

A maximum coding unit 1300 includes coding units 1302, 1304, 1306, 1312, 1314, 1316, and 1318 of respective coded depths. In particular, because the coding unit 1318 is a coding unit of a coded depth, split information may be set equal to 0. Information relating to a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (i.e., a TU size flag) of a transformation unit is equal to 0, and a transformation unit 1344 having a size of N×N is set if a TU size flag is equal to 1.

When the partition type is set to be asymmetrical, i.e., the partition type 1332, 1334, 1336, or 1338, a transformation unit 1352 having a size of 2N×2N is set if a TU size flag is equal to 0, and a transformation unit 1354 having a size of N/2×N/2 is set if a TU size flag is equal to 1.

The TU size flag may be a flag having a value equal to either 0 or 1, but the TU size flag is not limited to one bit, and a transformation unit may be hierarchically split into a tree structure in accordance with an increase in the TU size flag from 0.

In particular, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 may encode maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, the size of the transformation unit may be 16×16 when the TU size flag is 1, and the size of the transformation unit may be 8×8 when the TU size flag is 2.

As another example, if the size of the current coding unit is 32×32 and a minimum transformation unit size is 32×32, then the size of the transformation unit may be 32×32 when the TU size flag is 0. In this example, the TU size flag cannot be set to a value other than 0, because the size of the transformation unit cannot be less than 32×32.

As another example, if the size of the current coding unit is 64×64 and a maximum TU size flag is 1, then the TU size flag may be equal to either 0 or 1. In particular, the TU size flag cannot be set to a value other than 0 or 1.

Thus, if it is defined that the maximum TU size flag is "MaxTransformSizeIndex", a minimum transformation unit size is defined as "MinTransformSize", and a transformation unit size is defined as "RootTuSize" when the TU size flag is 0, then a current minimum transformation unit size "CurrMinTuSize" that can be determined in a current coding unit, may be defined by Equation (E1):

$$CurrMinTuSize=\max(MinTransformSize, RootTuSize/(2^{\wedge}MaxTransformSizeIndex)) \quad (E1)$$

By comparison with the current minimum transformation unit size "CurrMinTuSize" that can be determined in the current coding unit, a transformation unit size "RootTuSize" when the TU size flag is equal to 0 may denote a maximum transformation unit size that can be selected in the system. In Equation (E1), "RootTuSize/(2^MaxTransformSizeIndex)" denotes a transformation unit size when the transformation unit size "RootTuSize", when the TU size flag is equal to 0, is split a number of times corresponding to the maximum TU size flag, and "MinTransformSize" denotes a minimum transformation size. Thus, a smaller value from among "RootTuSize/(2^MaxTransformSizeIndex)" and "MinTransformSize" may be the current minimum transformation unit size "CurrMinTuSize" that can be determined in the current coding unit.

According to an exemplary embodiment, the maximum transformation unit size RootTuSize may vary according to the type of a prediction mode.

For example, if a current prediction mode is an inter mode, then "RootTuSize" may be determined by using Equation (E2) below. In Equation (E2), "MaxTransformSize" denotes a maximum transformation unit size, and "PUSize" denotes a current prediction unit size.

$$RootTuSize=\min(MaxTransformSize,PUSize) \quad (E2)$$

In particular, if the current prediction mode is the inter mode, the transformation unit size "RootTuSize" when the TU size flag is 0 may be a smaller value from among the maximum transformation unit size and the current prediction unit size.

If a prediction mode of a current partition unit is an intra mode, "RootTuSize" may be determined by using Equation (E3) below. In Equation (E3), "PartitionSize" denotes the size of the current partition unit.

$$RootTuSize=\min(MaxTransformSize, PartitionSize) \quad (E3)$$

In particular, if the current prediction mode is the intra mode, the transformation unit size "RootTuSize" when the TU size flag is 0 may be a smaller value from among the maximum transformation unit size and the size of the current partition unit.

However, the current maximum transformation unit size "RootTuSize" that varies according to the type of a prediction mode in a partition unit is just an example and is not limited thereto.

Figure 14:
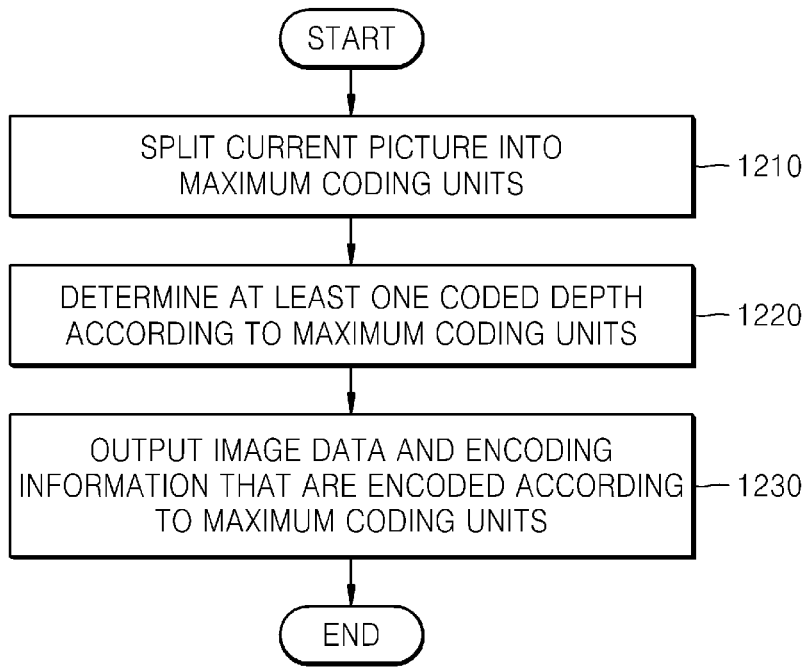
FIG. 14 is a flowchart which illustrates a method for encoding video, according to an exemplary embodiment.

FIG. 14 is a flowchart which illustrates a method for encoding a video, according to an exemplary embodiment.

In operation 1210, at least one region of a current picture is assigned, or split, into at least one maximum coding unit. A maximum depth indicating the total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth increases, and thus the maximum coding unit is split into coding units of a lower depth. Each coding unit may be split into coding units of another lower depth by being spatially split independently from adjacent coding units. Encoding is repeatedly performed on each coding unit according to depths.

Further, a transformation unit according to partition types having the least encoding error is determined for each deeper coding unit. In order to determine a coded depth having a minimum encoding error in each maximum coding unit, encoding errors may be measured and compared in all deeper coding units according to depths.

In operation 1230, encoded image data that is a final result of encoding the at least one split region and encoded information relating to the coded depth and an encoding mode are outputted according to the at least one maximum coding unit. The information relating to the encoding mode may include information relating to a coded depth or split information, and information relating to a partition type of a prediction unit, a prediction mode, and a size of a transformation unit. The encoded information relating to the encoding mode may be transmitted to a decoder with the encoded image data.

Figure 15:
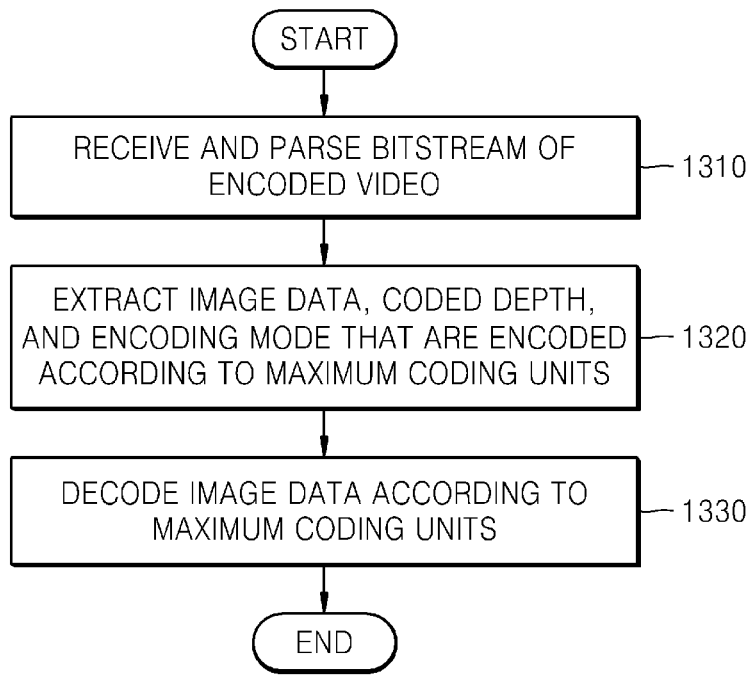
FIG. 15 is a flowchart which illustrates a method for decoding video, according to an exemplary embodiment.

FIG. 15 is a flowchart which illustrates a method for decoding a video, according to an exemplary embodiment.

In operation 1310, a bitstream which includes an encoded video is received and parsed.

In operation 1320, encoded image data relating to a current picture assigned to a maximum coding unit, and information relating to a coded depth and an encoding mode according to maximum coding units are extracted from the parsed bitstream. The coded depth of each maximum coding unit is a depth having the least encoding error in each maximum coding unit. In encoding each maximum coding unit, the image data is encoded based on at least one data unit obtained by hierarchically splitting the each maximum coding unit according to depths.

According to the information relating to the coded depth and the encoding mode, the maximum coding unit may be split into coding units having a tree structure. Each of the coding units having the tree structure is determined as a coding unit corresponding to a coded depth, and is optimally encoded so as to output the least encoding error. Accordingly, encoding and decoding efficiency with respect to an image may be improved by decoding each piece of encoded image data in the coding units after determining at least one coded depth according to coding units.

In operation 1330, the image data relating to each maximum coding unit is decoded based on the information relating to the coded depth and the encoding mode according to the maximum coding units. The decoded image data may be reproduced by a reproducing apparatus, stored in a storage medium, or transmitted via a network.

Encoding and decoding of video, which is performed based on spatially hierarchical data units and by using adaptive loop filtering, will be described in greater detail with reference to FIGS. 16 to 21 below.

Figure 16:
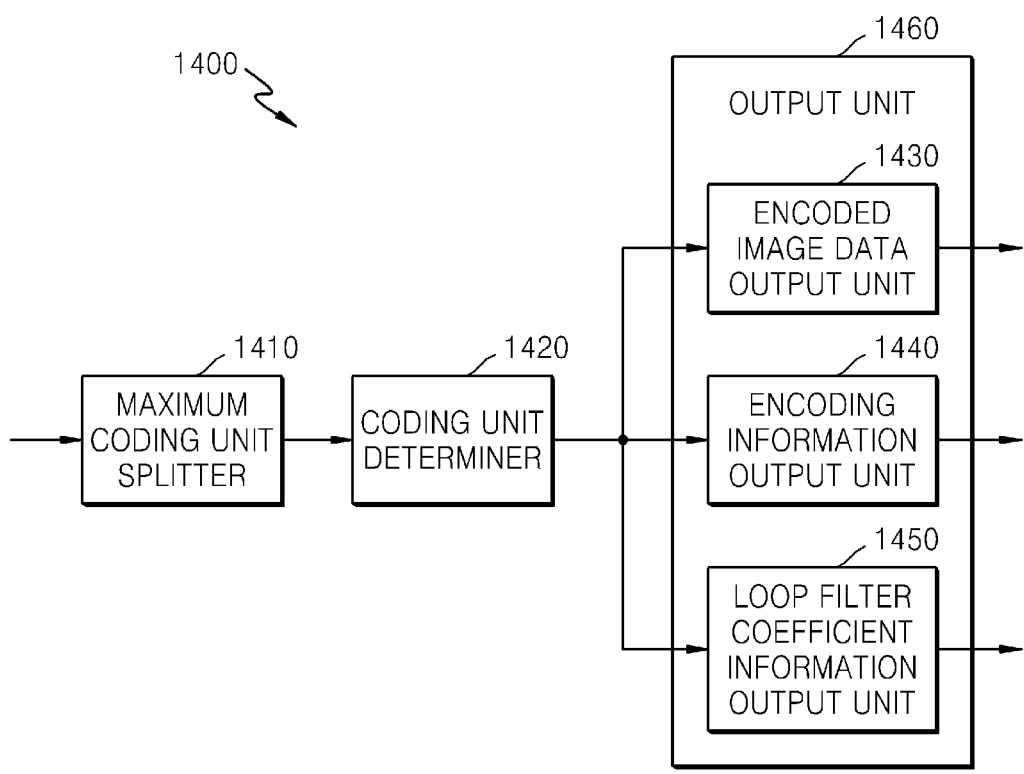
FIG. 16 is a block diagram of a video encoding apparatus which uses loop filtering performed by using continuous one-dimensional (1D) filtering, according to an exemplary embodiment.

FIG. 16 is a block diagram of a video encoding apparatus 1400 which uses loop filtering performed by using continuous one-dimensional (1D) filtering, according to an exemplary embodiment.

The video encoding apparatus 1400 includes a maximum coding unit splitter 1410, a coding unit determiner 1420, and an output unit 1460. The output unit 1460 includes an encoded image data output unit 1430, an encoding information output unit 1440, and a loop filter coefficient information output unit 1450.

Operations of the maximum coding unit splitter 1410 and the coding unit determiner 1420 are respectively the same as those of the maximum coding unit splitter 110 and the coding unit determiner 120 included in the video encoding apparatus 100 described above with reference to FIG. 1. The encoded image data output unit 1430 and the encoding information output unit 1440 perform some of the same operations as those of the output unit 130 of the video encoding apparatus 100 of FIG. 1.

By comparison with the video encoding apparatus 100, the video encoding apparatus 1400 performs video encoding that includes loop filtering by using the continuous 1D filtering. The loop filtering performed by the video encoding apparatus 1400 according to an exemplary embodiment will now be described in detail.

According to an exemplary embodiment, the maximum coding unit splitter 1410 may split a current picture of an image, based on a maximum coding unit for the current picture. The coding unit determiner 1420 encodes image data in units of coding units according to depths, for each of maximum coding units, and determines a coded depth for outputting a final encoding result, in units of at least one split region of the current picture.

According to an exemplary embodiment, the encoded image data output unit 1430 outputs a bitstream which includes the image data that has been encoded in units of maximum coding units, based on the coded depth. The encoding information output unit 1440 encodes and outputs information relating to encoding modes according to depths, in units of the maximum coding units.

According to an exemplary embodiment, the loop filter coefficient information output unit 1450 encodes and outputs filter coefficient information relating to loop filtering performed by using the continuous 1D filtering, during encoding of the current picture and after deblocking is performed. According to an exemplary embodiment, loop filtering is performed by continuously performing filtering by using a plurality of 1D filters. Loop filtering may be separately performed on luma components and chroma components.

If the video encoding apparatus 1400 according to the current embodiment corresponds to the image encoder 400 of FIG. 4, then a quantized transformation coefficient is restored to temporal-domain data by operation of the inverse quantizer 460 and the inverse transformer 470. Then, the restored temporal-domain data is sequentially processed by the deblocking unit 480 and the loop filtering unit 490 to obtain a reference frame 495. According to an exemplary embodiment, the loop filter coefficient information output unit 1450 may encode and output a filter coefficient used in the loop filtering unit 490.

The encoded filter coefficient information includes filter coefficient information regarding respective 1D filters. The filter coefficient information relating to each of the 1D filters may include information relating to the respective difference between a corresponding pair of continuous filter coefficients thereof. In particular, a residual component between a respective pair of filter coefficients of each of the 1D filters may be encoded. Specifically, the loop filter coefficient information output unit 1450 may encode the respective difference between a current filter coefficient and a corresponding previous filter coefficient of each of the 1D filters, as residual information.

In the continuous 1D filtering, filtering may be successively and/or continuously performed by using each of a horizontal 1D filter and a vertical 1D filter. In particular, in one example, horizontal 1D filtering may be performed on nine pieces of continuous deblocked data arranged in a horizontal direction, and then, vertical 1D filtering may be continuously performed on nine pieces of continuous deblocked data arranged in a vertical direction. In this example, the horizontal 1D filter and the vertical 1D filter may be symmetrical to each other, and the total number of filter coefficients of each of the horizontal 1D filter and the vertical 1D filter may be five.

Filter coefficients of each of 1D filters may be determined based on a Wiener filter approach.

According to an exemplary embodiment, the video encoding apparatus 1400 may determine the filter coefficient information, e.g., a total number, sizes, and types of 1D filters, quantization bits, coefficients, a filtering direction, whether filtering is to be performed, and whether running filtering is to be performed, and may then encode and transmit information relating to a set of 1D filters that perform loop filtering, together with the filter coefficient information.

The information relating to the set of 1D filters may be set in units of data units, e.g., pictures, slices, or sequences.

For example, the 1D filters may be Wiener filters or another predetermined type of filter that includes symmetrical or asymmetrical filters. If the 1D filters are the Wiener filters, filter coefficients thereof may be determined by a cross-correlation matrix between the 1D filters. Thus, the filter coefficient information may include information regarding the cross-correlation matrix other than the filter coefficients of the 1D filters.

The filtering direction of each of the 1D filters may be a direction in which filtering is performed on pixels arranged on a straight line having a predetermined angle. For example, 1D filtering may be performed in a filtering direction having an angle of any value between ±0 and 180°, e.g., a vertical direction at an angle of ±90°, a horizontal direction at an angle of 0° or 180°, or a diagonal direction at an angle of ±45° or ±135°.

Alternatively, the filtering direction of each of the 1D filters may be determined adaptively based on the characteristics of a local image included in the image data. For example, a filter may be set in such a manner that an edge of the local image may be detected from image data, and then 1D filtering may be performed in the direction of the detected edge.

A plurality of sets of 1D filters may be classified into sets of sub filters, each including at least one continuous 1D filter, and then, whether the 1D filtering is to be performed in units of the sets of sub filters may be determined. In particular, whether all filters belonging to the same set of sub filters will perform filtering may be determined.

Further, whether the running filtering in which 1D filtering of a current pixel is influenced by a result of 1D filtering a previous pixel is to be performed may be determined. In 1D filtering based on the running filtering, when a result of filtering a previous pixel is updated, a current pixel may be continuously filtered by receiving data obtained by filtering the previous pixel.

Figure 17:
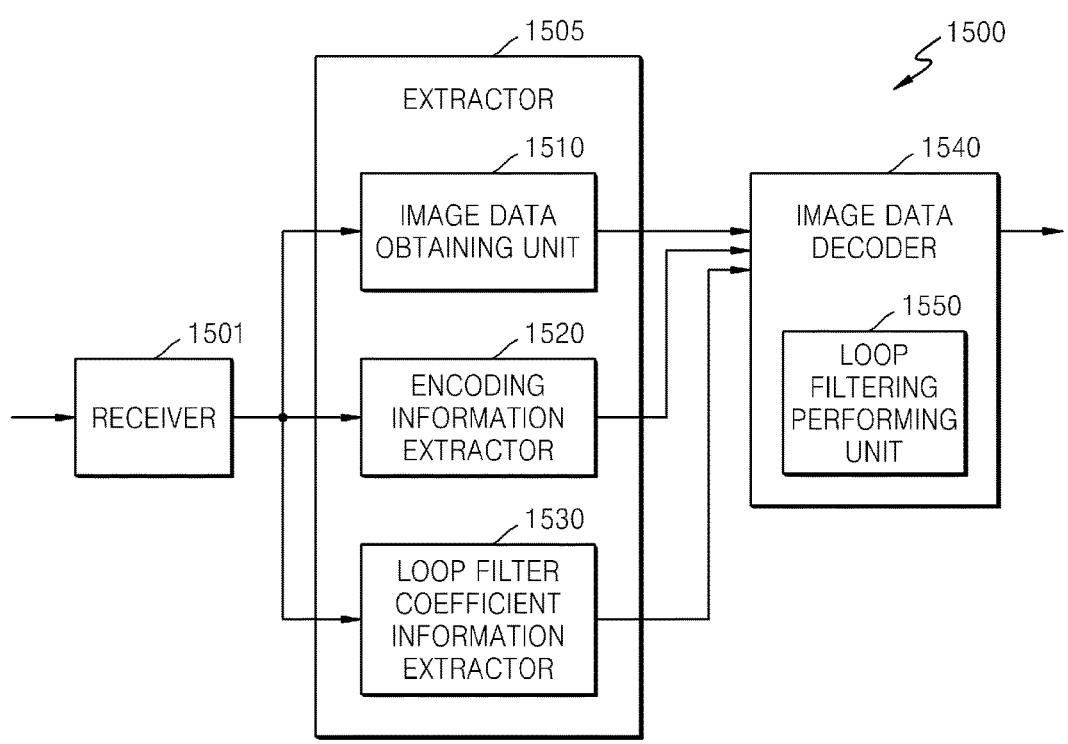
FIG. 17 is a block diagram of a video decoding apparatus using loop filtering performed by using the continuous 1D filtering, according to an exemplary embodiment.

FIG. 17 is a block diagram of a video decoding apparatus 1500 using loop filtering performed by using the continuous 1D filtering, according to an exemplary embodiment.

The video decoding apparatus 1500 includes a receiver 1501, an extractor 1505, and an image data decoder 1540. The extractor 1505 includes an image data obtaining unit 1510, an encoding information extractor 1520, and a loop filter coefficient information extractor 1530. The image data decoder 1540 corresponds to the image data decoder 230 included in the video decoding apparatus 200 described above with reference to FIG. 2. The image data obtaining unit 1510 and the encoding information extractor 1520 perform some of the same operations as those of the extractor 220 of the video decoding apparatus 200.

By comparison with the image data decoder 230, the image data decoder 1540 includes a loop filtering performing unit 1550 that performs loop filtering by using the continuous 1D filtering. According to an exemplary embodiment, the video decoding apparatus 1500 performs decoding by performing adaptive loop filtering by using the continuous 1D filtering, as will be described in detail below.

The receiver 1501 receives and parses a bitstream which includes encoded video of a current picture, and the extractor 1505 extracts various encoded information from the parsed bitstream. The image data obtaining unit 1510 may obtain image data encoded in units of maximum coding units, from the parsed bitstream. The encoding information extractor 1520 parses the bitstream, and extracts information relating to a coded depth and an encoding mode for each of the maximum coding units, from a header of the bitstream regarding the current picture.

The loop filter coefficient information extractor 1530 extracts filter coefficient information for performing loop filtering on the current picture. If loop filtering is performed by using the continuous 1D filtering, the loop filter coefficient information extractor 1530 may extract filter coefficients of each of a plurality of 1D filters.

The loop filter coefficient information extractor 1530 may extract residual information relating to respective pairs of continuous filter coefficients of each of the plurality of 1D filters that perform the continuous 1D filtering.

The image data decoder 1540 restores the current picture by decoding the image data encoded in units of the maximum coding units, based on the information relating to the coded depth and the encoding mode for each of the maximum coding units. The image data decoder 1540 may perform deblocking on data of the current picture, which has been decoded to temporal-domain image data, and perform loop filtering on the deblocked data by using the filter coefficients extracted by the loop filter coefficient information extractor 1530. Loop filtering may be separately performed on luma components and chroma components.

If the image data decoder 1540 corresponds to the image decoder 500 of FIG. 5, then the loop filtering performing unit 1550 of the image data decoder 1540 may correspond to the loop filtering unit 580 of the image data decoder 1540, and may perform the continuous 1D filtering on data deblocked by the deblocking unit 570. The data that was deblocked and loop-filtered may be stored in a buffer (not shown) and may be used as a reference image for compensating for a motion of a subsequent picture.

The loop filtering performing unit 1550 successively and/or continuously performs 1D filtering in a horizontal direction and then in a vertical direction to restore the current picture. The loop filtering performing unit 1550 may derive a filter coefficient of each of a plurality of 1D filters, based on the residual information received from the loop filter coefficient information extractor 1530.

For example, a respective current filter coefficient of each of the 1D filters may be derived by adding the difference between the respective current filter coefficient and a corresponding previous filter coefficient to the previous filter coefficient. The continuous 1D filtering may be performed on the deblocked data by using the respective derived filter coefficient of each of the 1D filters. Deblocking is performed to reduce a blocking effect occurring in decoded data, and loop filtering is performed to minimize an error between a restored image and the original image.

Loop filtering performed by using the continuous 1D filtering performed in horizontal and vertical directions will be described in detail below.

A current filter coefficient may be calculated by using the following equation:

$$c[i][j]=\text{adaptive\_loop\_filter\_prev}[i][j]+\text{adaptive\_loop\_filter}[i][j] \quad (E4),$$

wherein "i" denotes an index of each of a plurality of 1D filters, "j" denotes an index of a filter coefficient of each of the 1D filters, "c[i][j]" denotes a current filter coefficient, "adaptive_loop_filter_prev[i][j]" denotes a previous filter coefficient, and "adaptive_loop_filter[i][j]" denotes a residual component relating to a respective pair of filter coefficients that is transmitted as filter coefficient information.

In particular, the respective current filter coefficient c[i][j] may be calculated by adding the corresponding previous filter coefficient adaptive_loop_filter_prev[i][j] and the corresponding residual component adaptive_loop_filter[i][j]. Then, for a subsequent operation, the previous filter coefficient adaptive_loop_filter_prev[i][j] is updated to be equal to the current filter coefficient c[i][j] so as to derive a subsequent filter coefficient.

Loop filtering performed by using the continuous 1D filtering may be performed according to Equations (E5) and (E6). In Equations (E5) and (E6), "i" denotes a horizontal index of a current picture and "j" denotes a vertical index of the current picture.

$$q_{i,j}=(p_{i,j-4}*c[0][4]+p_{i,j-3}*c[0][3]+p_{i,j-2}*c[0][2]+p_{i,j-1}*c[0][1]+p_{i,j}*c[0][0]+p_{i,j+1}*c[0][1]+p_{i,j+2}*c[0][2]+p_{i,j+3}*c[0][3]+p_{i,j+4}*c[0][4]) \quad (E5),$$

wherein "$p_{i,j}$" denotes deblocked data of the current picture, and "$q_{i,j}$" denotes data obtained by performing 1D filtering on the deblocked data in a vertical direction. Nine pieces of data of the deblocked data may be symmetrically filtered by using five filter coefficients c[i][0] to c[i][4] of a symmetrical filter.

$$f_{i,j}=(q_{i,j-4}*c[1][4]+q_{i,j-3}*c[1][3]+q_{i,j-2}*c[1][2]+q_{i,j-1}*c[1][1]+q_{i,j}*c[1][0]+q_{i,j+1}*c[1][1]+q_{i,j+2}*c[1][2]+q_{i,j+3}*c[1][3]+q_{i,j+4}*c[1][4]) \quad (E6),$$

wherein "$f_{i,j}$" denotes data obtained by performing 1D filtering on the data $q_{i,j}$ in a vertical direction. Because the filter coefficient c is subject to the running filtering, 1D filtering is continuously performed on the data, which has been 1D-filtered in the horizontal direction, in the vertical direction.

In the case of symmetrical filters, all filter coefficients of 1D filters may be set by using a lesser number of possible coefficients than a corresponding number of possible coefficients required for two-dimensional (2D) filters. Thus, a number of bits of information relating to filter characteristics of a set of 1D filters to be inserted into a bitstream is less than a number of bits of information relating to filter characteristics of a set of 2D filters to be inserted into a bitstream.

Further, a capacity of memory required by the set of 1D filters for temporarily storing data during filtering is less than a corresponding capacity of memory required by the set of 2D filters for temporary storage. An amount of calculation which is required when filtering is performed using the set of 2D filters is far greater than a corresponding amount of calculation which is required when filtering is performed using the set of 1D filters. In the case of the running filtering, a plurality of filtering operations cannot be simultaneously performed when using a set of 2D filters but can be simultaneously performed when using a set of 1D filters.

However, loop filtering according to the present disclosure is not limited to successively and/or continuously performing 1D filtering in the horizontal and vertical directions. According to another exemplary embodiment, loop filtering may be performed by successively and/or continuously performing filtering by using an arbitrary number of 1D filters, in arbitrary directions.

According to an exemplary embodiment, the video decoding apparatus 1500 may receive not only filter coefficient information, but also information regarding a set of 1D filters for performing loop filtering, and thus may determine, for example, a number, types, and sizes of the set of 1D filters, quantization bits, coefficients, a filtering direction, whether filtering is to be performed, and whether the running filtering is to be performed. Thus, the loop filtering performing unit 1550 may perform loop filtering by using a combination of various 1D filters.

When post-processing is performed using loop filtering, it is possible to reduce a distortion between the original image and a restored image, which may be caused when a complicated lossy compression process is performed. In addition, a loop-filtered image may be used as a reference image when prediction or motion compensation is performed, thereby improving image quality.

When a combination of various types of 1D filters is used, adaptive loop filtering may be performed based on consideration of, for example, the characteristics of an image, a system environment, and/or a user demand. In addition, when continuous 1D filters are used instead of 2D filters, it is possible to reduce memory capacity, an amount of calculation, and a number of transmission bits, as compared with when the 2D filters are used. Furthermore, because a residual component relating to a respective pair of filter coefficients is encoded and transmitted, load on transmission of the filter coefficients may be reduced.

Figure 18:
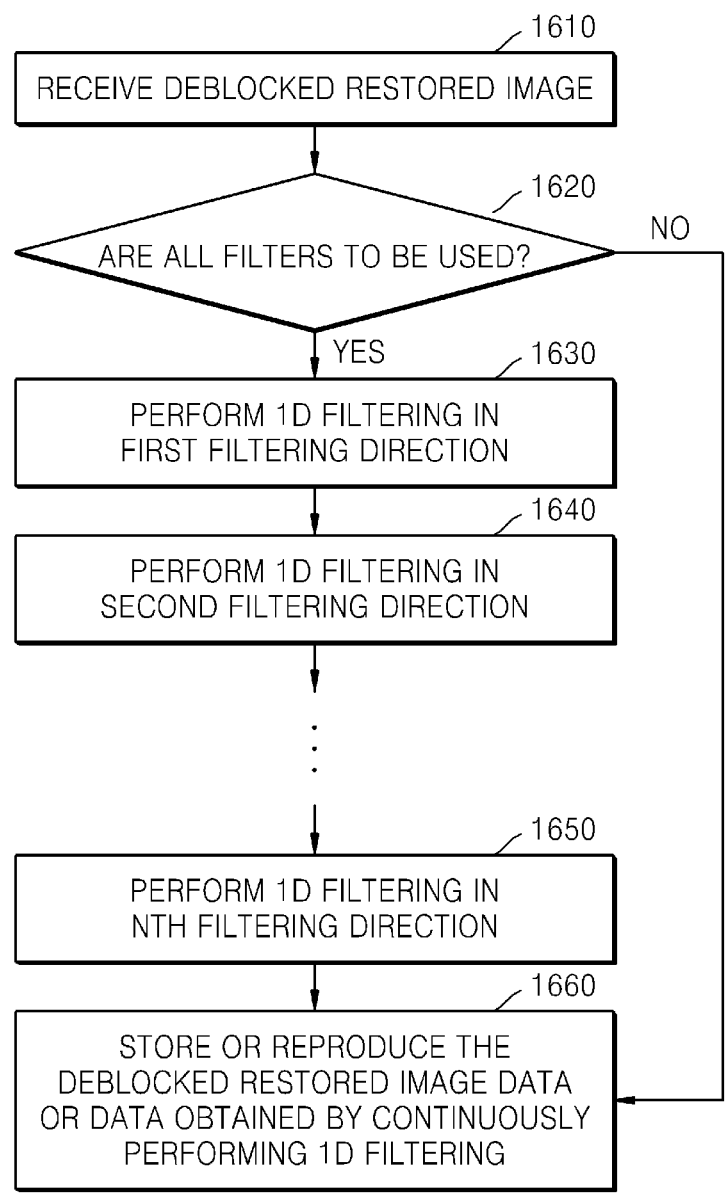
FIG. 18 is a flowchart which illustrates a method for performing the continuous 1D filtering, according to an exemplary embodiment.

FIG. 18 is a flowchart which illustrates a method for performing the continuous 1D filtering, according to an exemplary embodiment.

Loop filtering may be performed to continuously perform filtering with a plurality of 1D filters. In operation 1610, deblocked restored image data is received. In operation 1620, whether all of first through $N^{th}$ filters are to be used to perform filtering is determined. If it is determined in operation 1620 that at least one of the first through $N^{th}$ filters is not to be used, then the method proceeds to operation 1660 to store or reproduce the deblocked restored image data. If it is determined in operation 1620 that all of the first through $N^{th}$ filters are to be used, then filtering is sequentially performed on the deblocked reproduced image data by using the first through $N^{th}$ filters. In particular, in operation 1630, 1D filtering may be performed in a first filtering direction by using the first filter. In operation 1640, 1D filtering may be performed in a second filtering direction by using the second filter. In operation 1650, 1D filtering may be performed in an $N^{th}$ filtering direction by using the $N^{th}$ filter.

In operation 1660, either the deblocked restored image data or data obtained by continuously performing 1D filtering is stored in a buffer or reproduced by a reproducing apparatus.

Figure 19:
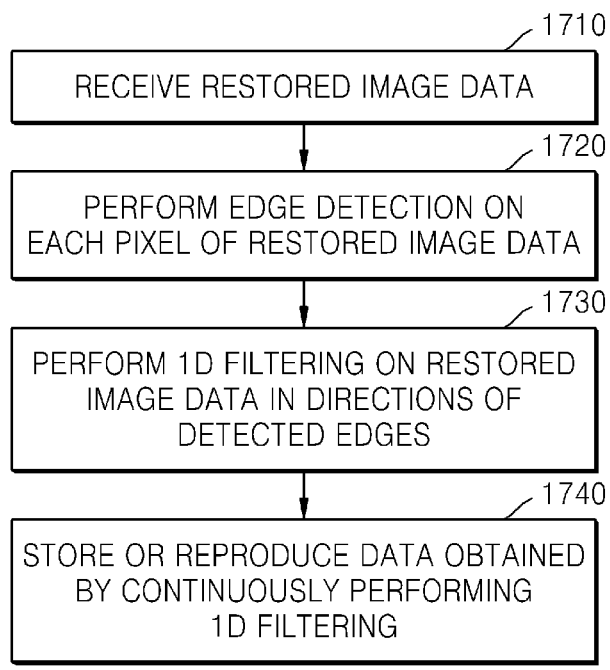
FIG. 19 is a flowchart which illustrates a method for performing the continuous 1D filtering, according to another exemplary embodiment.

FIG. 19 is a flowchart which illustrates a method for performing the continuous 1D filtering, according to another embodiment.

According to an exemplary embodiment, a filtering direction of a 1D filter may be determined adaptively based on the characteristics of a local image by performing an image characteristics analysis. For example, the filtering direction may be determined adaptively based on directions of edges of the local image in order to maintain the edges of the local image.

In operation 1710, restored image data is received. In operation 1720, edge detection is performed on each of pixels of the restored image data. In operation 1730, 1D filtering is respectively performed on the restored image data in directions of detected edges. In operation 1740, data obtained by continuously performing 1D filtering on the restored image data is stored or reproduced by a reproducing apparatus.

In a video encoding process, information relating to a set of 1D filters, which also includes filtering directions determined according to directions of edges of image data, may be encoded and provided to a decoding side. In a video decoding process, information relating to loop filtering may be extracted from the encoded information and may then be decoded. Then, 1D filtering may be performed in the filtering directions, such as edge directions of a 1D filter.

Figure 20:
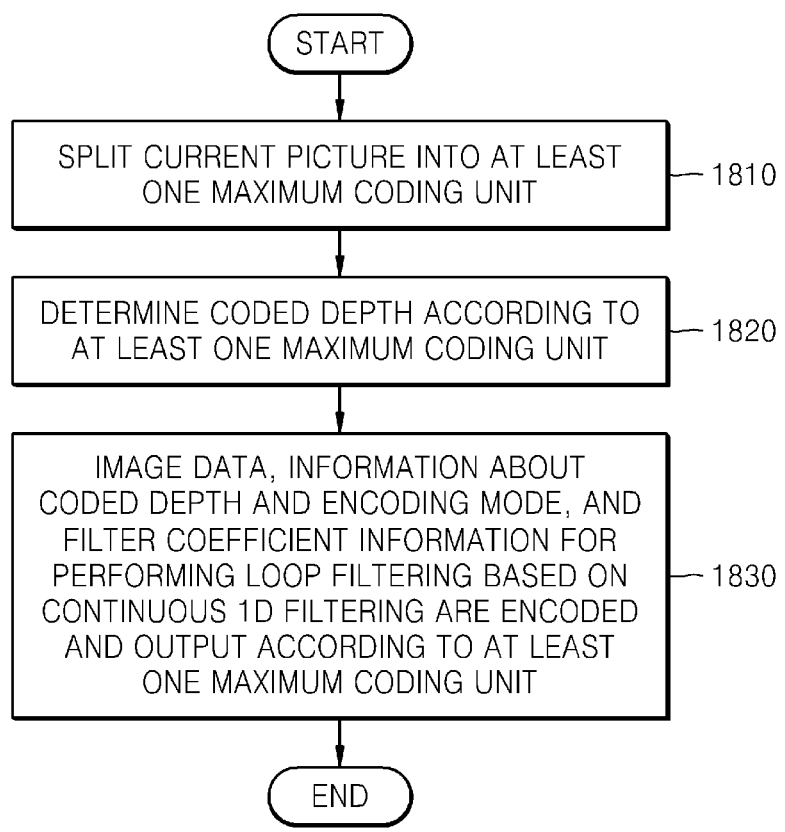
FIG. 20 is a flowchart which illustrates a method for encoding video by performing loop filtering by using the continuous 1D filtering, according to an exemplary embodiment.

FIG. 20 is a flowchart which illustrates a method for encoding video by performing loop filtering by using the continuous 1D filtering, according to an exemplary embodiment.

In operation 1810, a current picture is split into at least one maximum coding unit. In operation 1820, a coded depth for outputting a final coding result according to at least one split region, which is obtained by splitting a region of each of the at least one maximum coding unit according to depths, is determined by encoding the at least one split region.

In operation 1830, image data according to a coded depth and information relating to the coded depth and an encoding mode are encoded and output according to the at least one maximum coding unit. In addition, filter coefficient information relating to loop filtering performed by using the continuous 1D filtering, after deblocking is performed during the encoding of the current picture, may be encoded and outputted. The filter coefficient information may include information regarding residual components of respective pairs of continuous filter coefficients. The loop filtering may be performed by successively and/or continuously performing filtering by using each of a horizontal 1D filter and a vertical 1D filter. In the loop filtering, 1D filters used may be symmetrical filters, and filter coefficients of the 1D filters may be determined based on the Wiener filter approach.

Figure 21:
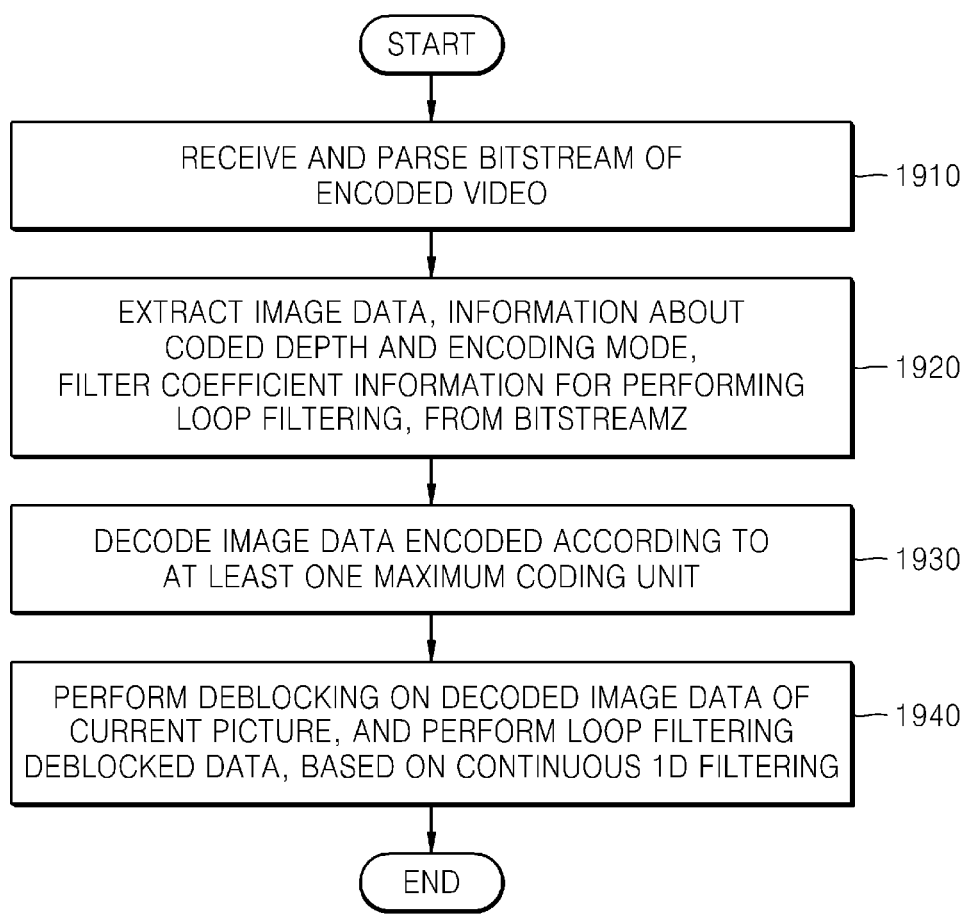
FIG. 21 is a flowchart which illustrates a method for decoding video by performing loop filtering by using the continuous 1D filtering, according to an exemplary embodiment.

FIG. 21 is a flowchart which illustrates a method for decoding video by performing loop filtering by using the continuous 1D filtering, according to an exemplary embodiment.

In operation 1910, a bitstream which includes encoded video is received and parsed.

In operation 1920, encoded image data of a current picture, which has been assigned to each of at least one maximum coding unit, and information relating to a coded depth and an encoding mode of each of the at least one maximum coding unit, are extracted from the parsed bitstream. Filter coefficient information for performing loop filtering on the current picture may further be extracted from the parsed bitstream. The filter coefficient information may include information regarding a residual component of a respective pair of filter coefficients of each of 1D filters. The filter coefficient information may include coefficients of each of a horizontal 1D filter and a vertical 1D filter.

In operation 1930, the image data encoded according to the at least one maximum coding unit may be decoded, based on the information relating to the coded depth and the encoding mode of each of the at least one maximum coding unit and coding unit pattern information.

In operation 1940, deblocking is performed on the decoded image data, and loop filtering is performed on the deblocked data, by using the continuous 1D filtering. If the residual component of a respective pair of the filter coefficients is extracted as the filter coefficient information, the residual component may be added to a corresponding previous filter coefficient, thus deriving a current filter coefficient. The continuous 1D filtering may be performed using a filter coefficient thusly derived for each of the 1D filters. The loop filtering may be separately performed on luma components and chroma components.

A required amount of calculation may be high when a large amount of image data or high-resolution image data is encoded or decoded in units of relatively small macroblocks. According to an exemplary embodiment, a coding unit selected appropriately to the size of image data is used to encode or decode the image data, and a maximum coding unit is hierarchically split into coding units, based on details of the image data. Based on the hierarchical coding units, a coding unit having the least coding error is determined in units of maximum coding units. In particular, it is possible to efficiently encode or decode the image data, based on the hierarchical coding units.

Further, in order to reduce an amount of calculation when a large amount of image data or high-resolution image data is post-processed, loop filtering is performed after deblocking is performed, by using the continuous 1D filtering other than 2D filtering. Thus, both of the required amount of calculation and a number of bits of filter coefficients to be transmitted may be reduced. Furthermore, a residual component relating to each respective pair of the filter coefficients may be transmitted instead of the corresponding filter coefficients, thereby improving the efficiency of data transmission.

The exemplary embodiments can be written as computer programs and can be implemented in general-use digital computers that execute the programs using a non-transitory computer readable recording medium. Examples of the non-transitory computer readable recording medium include magnetic storage media (e.g., read-only memory (ROM), floppy disks, hard disks, etc.) and optical recording media (e.g., compact disk ROMs (CD-ROMs), or digital video disks (DVDs)).

While the present inventive concept has been particularly shown and described with reference to exemplary embodiments thereof, it will be understood by those of ordinary skill in the art that various changes in form and details may be made therein without departing from the spirit and scope of the present inventive concept as defined by the appended claims. The exemplary embodiments should be considered in a descriptive sense only and not for purposes of limitation. Therefore, the scope of the present disclosure is defined not by the detailed description of the exemplary embodiments but by the appended claims, and all differences within the scope will be construed as being included in the present disclosure.

The invention claimed is:

1. A method for decoding video implemented by a processor, the method comprising:
  obtaining, by the processor, a size information of a maximum coding unit and information whether loop filtering for compensating pixel value is to be performed, from a bitstream;
  determining, by the processor, the maximum coding unit by splitting a picture, based on the size information of the maximum coding unit;
  reconstructing, by the processor, encoded image data of the maximum coding unit;
  determining, by the processor, a direction of an edge of the reconstructed image data of the maximum coding unit; and
  performing, by the processor, the loop filtering on deblocking filtered data of the reconstructed image data of the maximum coding unit, based on the information of whether the loop filtering is to be performed,
  wherein the loop filtering is performed according to the direction of the edge,
  wherein a coding unit among at least one coding unit in the maximum coding unit includes at least one prediction unit to perform prediction on the coding unit, and
  wherein the coding unit is split into at least one transformation unit independently from the at least one prediction unit.

2. A method for encoding video implemented by a processor, the method comprising:
  determining, by the processor, a maximum coding unit by splitting a picture;
  generating, by the processor, size information of the maximum coding unit;
  determining, by the processor, at least one prediction unit in a coding unit among at least one coding unit in the maximum coding unit;
  determining, by the processor, at least one transformation unit in the coding unit independently from the at least one prediction unit;
  generating, by the processor, reconstructed data of the maximum coding unit by using prediction data generated by performing prediction on a prediction unit among the at least one prediction unit and residual data generated by performing inverse-transformation on a transformation unit among the at least one transformation unit;
  performing, by the processor, a loop filtering on deblocking filtered data of the reconstructed data in order to compensate pixel values of the maximum coding unit; and
  generating, by the processor, information indicating whether the loop filtering is performed on the deblocking filtered data.

3. An apparatus for encoding video, the apparatus comprising:
  a processor configured to:
    determine a maximum coding unit by splitting a picture;
    generate size information of the maximum coding unit;
    determine at least one prediction unit in a coding unit among at least one coding unit in the maximum coding unit;
    determine at least one transformation unit in the coding unit independently from the at least one prediction unit;
    generate reconstructed data of the maximum coding unit by using prediction data generated by performing prediction on a prediction unit among the at least one prediction unit and residual data generated by performing inverse-transformation on a transformation unit among the at least one transformation unit;
    perform a loop filtering on deblocking filtered data of the reconstructed data in order to compensate pixel values of the maximum coding unit; and generate information indicating whether the loop filtering is performed on the deblocking filtered data.

4. A method for encoding video implemented by a processor, the method comprising:
   determining, by the processor, a maximum coding unit by splitting a picture;
   generating, by the processor, size information of the maximum coding unit;
   determining, by the processor, at least one prediction unit in a coding unit among at least one coding unit in the maximum coding unit;
   determining, by the processor, at least one transformation unit in the coding unit independently from the at least one prediction unit;
   generating, by the processor, reconstructed data of the maximum coding unit by using prediction data generated by performing prediction on a prediction unit among the at least one prediction unit and residual data generated by performing inverse-transformation on a transformation unit among the at least one transformation unit;
   determining, by the processor, a direction of an edge of the reconstructed data of the maximum coding unit; and
   performing, by the processor, a loop filtering on deblocking filtered data of the reconstructed data in order to compensate pixel values of the maximum coding unit, wherein the loop filtering is performed according to the direction of the edge.

5. An apparatus for encoding video, the apparatus comprising:
   a processor configured to:
      determine a maximum coding unit by splitting a picture;
      generate size information of the maximum coding unit;
      determine at least one prediction unit in a coding unit among at least one coding unit in the maximum coding unit;
      determine at least one transformation unit in the coding unit independently from the at least one prediction unit;
      generate reconstructed data of the maximum coding unit by using prediction data generated by performing prediction on a prediction unit among the at least one prediction unit and residual data generated by performing inverse-transformation on a transformation unit among the at least one transformation unit;
      determine a direction of an edge of the reconstructed data of the maximum coding unit; and
      perform a loop filtering on deblocking filtered data of the reconstructed data in order to compensate pixel values of the maximum coding unit, wherein the loop filtering is performed according to the direction of the edge.

6. A method for encoding video implemented by a processor, the method comprising:
   determining, by the processor, a maximum coding unit by splitting a picture;
   generating, by the processor, size information of the maximum coding unit;
   determining, by the processor, at least one prediction unit in a coding unit among at least one coding unit in the maximum coding unit;
   determining, by the processor, at least one transformation unit in the coding unit independently from the at least one prediction unit;
   generating, by the processor, reconstructed data of the maximum coding unit by using prediction data generated by performing prediction on a prediction unit among the at least one prediction unit and residual data generated by performing inverse-transformation on a transformation unit among the at least one transformation unit;
   determining, by the processor, a direction of an edge of the reconstructed data of the maximum coding unit;
   performing, by the processor, a loop filtering on deblocking filtered data of the reconstructed data in order to compensate pixel values of the maximum coding unit, wherein the loop filtering is performed according to the direction of the edge; and
   generating, by the processor, information indicating whether the loop filtering is performed on the deblocking filtered data.

7. A non-transitory computer-readable medium for recording instructions which, when executed by at least one processor, cause the at least one processor to:
   generate a bitstream by executing operations for video encoding using the at least one processor, the bitstream comprising:
      size information of a maximum coding unit split from a picture;
      information indicating whether a loop filtering is performed on deblocking filtered data of reconstructed data of the maximum coding unit; and
      encoded data generated based on compensated pixel values of the maximum coding unit,
   wherein the operations include:
      determining at least one prediction unit in a coding unit among at least one coding unit in the maximum coding unit;
      determining at least one transformation unit in the coding unit independently from the at least one prediction unit;
      generating reconstructed data of the maximum coding unit by using prediction data generated by performing prediction on a prediction unit among the at least one prediction unit and residual data generated by performing inverse-transformation on a transformation unit among the at least one transformation unit;
      performing the loop filtering on the deblocking filtered data of the reconstructed data in order to compensate pixel values of the maximum coding unit; and
      generating the compensated pixel values of the maximum coding unit.

8. A non-transitory computer-readable medium for recording instructions which, when executed by at least one processor, cause the at least one processor to:
   generate a bitstream by executing operations for video encoding using the at least one processor, the bitstream comprising:
      size information of a maximum coding unit split from a picture; and
      encoded data generated based on compensated pixel values of the maximum coding unit,
   wherein the operations include:
      determining at least one prediction unit in a coding unit among at least one coding unit in the maximum coding unit;
      determining at least one transformation unit in the coding unit independently from the at least one prediction unit;
      generating reconstructed data of the maximum coding unit by using prediction data generated by performing prediction on a prediction unit among the at least one prediction unit and residual data generated by performing inverse-transformation on a transformation unit among the at least one transformation unit;

determining a direction of an edge of the reconstructed data of the maximum coding unit;

performing a loop filtering on deblocking filtered data of the reconstructed data in order to compensate pixel values of the maximum coding unit, wherein the loop filtering is performed according to the direction of the edge; and generating the compensated pixel values of the maximum coding unit.

9. A non-transitory computer-readable medium for recording instructions which, when executed by at least one processor, cause the at least one processor to:

generate a bitstream by executing operations for video encoding using the at least one processor, the bitstream comprising:

size information of a maximum coding unit split from a picture;

information indicating whether a loop filtering is performed on deblocking filtered data of reconstructed data of the maximum coding unit; and encoded data generated based on compensated pixel values of the maximum coding unit, wherein the operations include:

determining at least one prediction unit in a coding unit among at least one coding unit in the maximum coding unit;

determining at least one transformation unit in the coding unit independently from the at least one prediction unit;

generating reconstructed data of the maximum coding unit by using prediction data generated by performing prediction on a prediction unit among the at least one prediction unit and residual data generated by performing inverse-transformation on a transformation unit among the at least one transformation unit;

determining a direction of an edge of the reconstructed data of the maximum coding unit;

performing the loop filtering on the deblocking filtered data of the reconstructed data in order to compensate pixel values of the maximum coding unit, wherein the loop filtering is performed according to the direction of the edge; and generating the compensated pixel values of the maximum coding unit.

10. A non-transitory computer-readable medium for recording instructions which, when executed by at least one processor, cause the at least one processor to:

generate a bitstream by executing operations for video encoding using the at least one processor, the bitstream comprising:

size information of a maximum coding unit split from a picture;

split information indicating whether the maximum coding unit is split into at least one coding unit;

information indicating whether a loop filtering is performed on deblocking filtered data of reconstructed data of the maximum coding unit; and encoded data generated based on compensated pixel values of the maximum coding unit, wherein the operations include:

determining at least one prediction unit in a coding unit among the at least one coding unit in the maximum coding unit;

determining at least one transformation unit in the coding unit independently from the at least one prediction unit;

generating reconstructed data of the maximum coding unit by using prediction data generated by performing prediction on a prediction unit among the at least one prediction unit and residual data generated by performing inverse-transformation on a transformation unit among the at least one transformation unit;

performing the loop filtering on the deblocking filtered data of the reconstructed data in order to compensate pixel values of the maximum coding unit; and generating the compensated pixel values of the maximum coding unit.

11. A non-transitory computer-readable medium for recording instructions which, when executed by at least one processor, cause the at least one processor to:

generate a bitstream by executing operations for video encoding using the at least one processor, the bitstream comprising:

size information of a maximum coding unit split from a picture;

split information indicating whether the maximum coding unit is split into at least one coding unit; and encoded data generated based on compensated pixel values of the maximum coding unit, wherein the operations include:

determining at least one prediction unit in a coding unit among the at least one coding unit in the maximum coding unit;

determining at least one transformation unit in the coding unit independently from the at least one prediction unit;

generating reconstructed data of the maximum coding unit by using prediction data generated by performing prediction on a prediction unit among the at least one prediction unit and residual data generated by performing inverse-transformation on a transformation unit among the at least one transformation unit;

determining a direction of an edge of the reconstructed data of the maximum coding unit;

performing a loop filtering on deblocking filtered data of the reconstructed data in order to compensate pixel values of the maximum coding unit, wherein the loop filtering is performed according to the direction of the edge; and generating the compensated pixel values of the maximum coding unit.

* * * * *